United States Patent
Reik et al.

[11] Patent Number: 5,176,234
[45] Date of Patent: Jan. 5, 1993

[54] METHOD OF REGULATING THE OPERATION OF AUTOMATIC CLUTCHES

[75] Inventors: Wolfgang Reik, Bühl/Baden; Paul Maucher, Sasbach; Louis F. Schulte, Ottersweier; Burkhard Brandner; Boguslaw Maciejewski, both of Werdohl; Jörg Holwe, Hemer, all of Fed. Rep. of Germany

[73] Assignee: Luk Lamellen und Kupplungsbau GmbH, Bühl/Baden, Fed. Rep. of Germany

[21] Appl. No.: 510,261

[22] Filed: Apr. 17, 1990

[30] Foreign Application Priority Data

Apr. 17, 1989 [DE] Fed. Rep. of Germany ....... 3912562
May 22, 1989 [DE] Fed. Rep. of Germany ....... 3916644
Oct. 17, 1989 [DE] Fed. Rep. of Germany ....... 3934541

[51] Int. Cl.⁵ ............................................ F16D 25/12
[52] U.S. Cl. .............................. 192/0.052; 192/0.032; 192/750.0
[58] Field of Search ............... 192/0.052, 0.033, 0.032, 192/0.075, 0.076, 0.092

[56] References Cited

U.S. PATENT DOCUMENTS

| | | | |
|---|---|---|---|
| 4,295,551 | 10/1981 | Zimmerman et al. | 192/0.076 |
| 4,509,625 | 4/1985 | Tellert | 192/0.052 X |
| 4,572,341 | 2/1986 | Maucher | 192/13 R |
| 4,577,741 | 3/1986 | Schmid | 192/85 V |
| 4,718,525 | 1/1988 | Yamaguchi | 192/0.052 |
| 4,730,708 | 3/1988 | Hamano et al. | 192/0.092 X |
| 4,732,055 | 3/1988 | Tateno et al. | 192/0.075 X |
| 4,732,246 | 3/1988 | Tateno et al. | 192/0.052 |
| 4,732,250 | 3/1988 | Maucher | 192/110 B |
| 4,747,586 | 5/1988 | Reik | 267/161 |
| 4,796,718 | 1/1989 | Thielen et al. | 192/0.052 X |
| 4,800,497 | 1/1989 | Koori et al. | 192/0.092 X |
| 4,803,628 | 2/1989 | Hayashi et al. | 192/0.052 X |
| 4,854,433 | 8/1989 | Tellert | 192/0.052 X |
| 4,858,131 | 8/1989 | Sugimura et al. | 192/0.033 X |
| 4,874,070 | 10/1989 | Nellums et al. | 192/0.052 |
| 4,898,049 | 2/1990 | Niikura | 192/0.033 X |
| 4,926,994 | 5/1990 | Koshizawa et al. | 192/0.052 X |
| 4,971,183 | 11/1990 | Tellert | 192/0.033 |

Primary Examiner—Leslie A. Braun
Assistant Examiner—Andrea Pitts
Attorney, Agent, or Firm—Peter K. Kontler

[57] ABSTRACT

The operation of an automated friction clutch between the output element of the engine and the input element of the variable-speed transmission in a motor vehicle is regulated by a fluid-operated system which receives signals from an evaluating circuit. The evaluating circuit receives signals from a number of sensors which monitor the RPM of the engine, the RPM of the input element of the transmission, clutch travel, the position of the throttle valve, the position of the shift linkage, the position of the gas pedal and other parameters. The fluid-operated system can select the condition of the clutch during starting, driving, acceleration, parking, driving in reverse and/or parking of the motor vehicle and/or during transitions between such stages of operation.

70 Claims, 11 Drawing Sheets

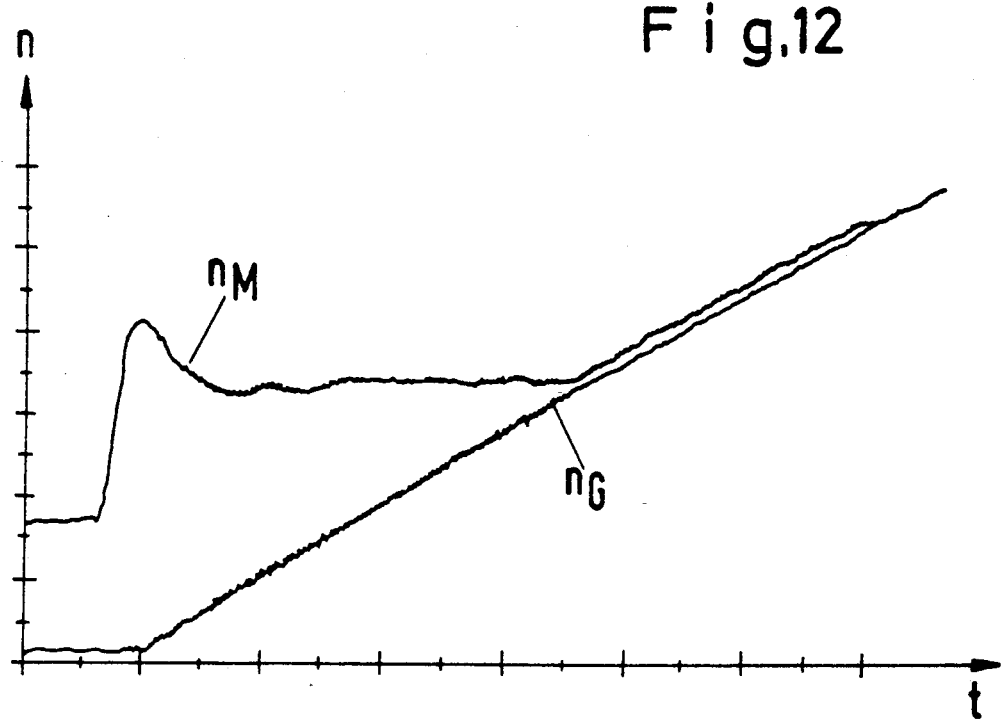
Fig. 12
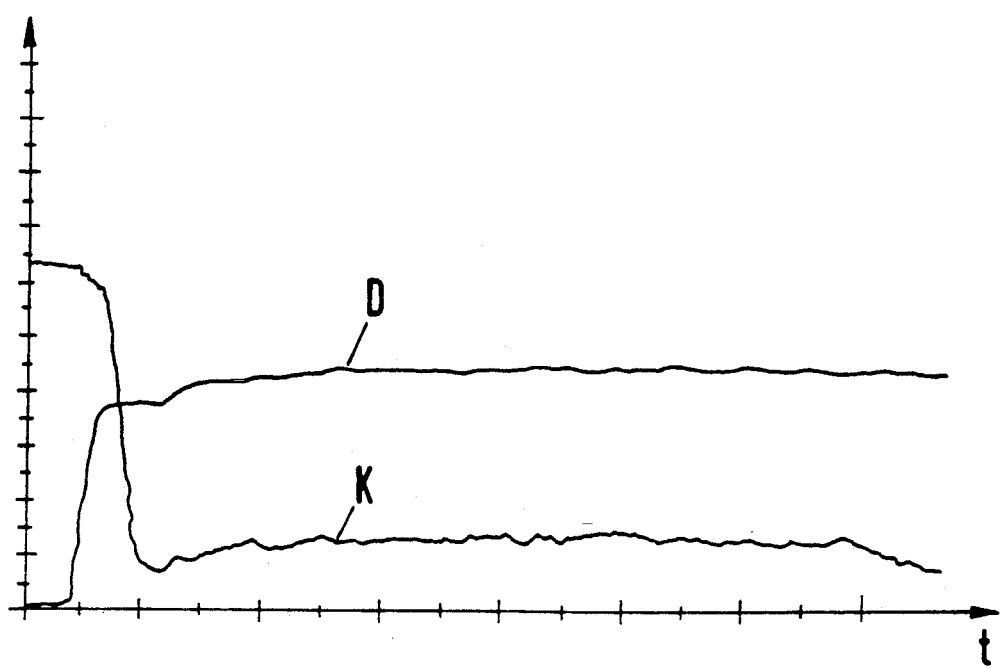

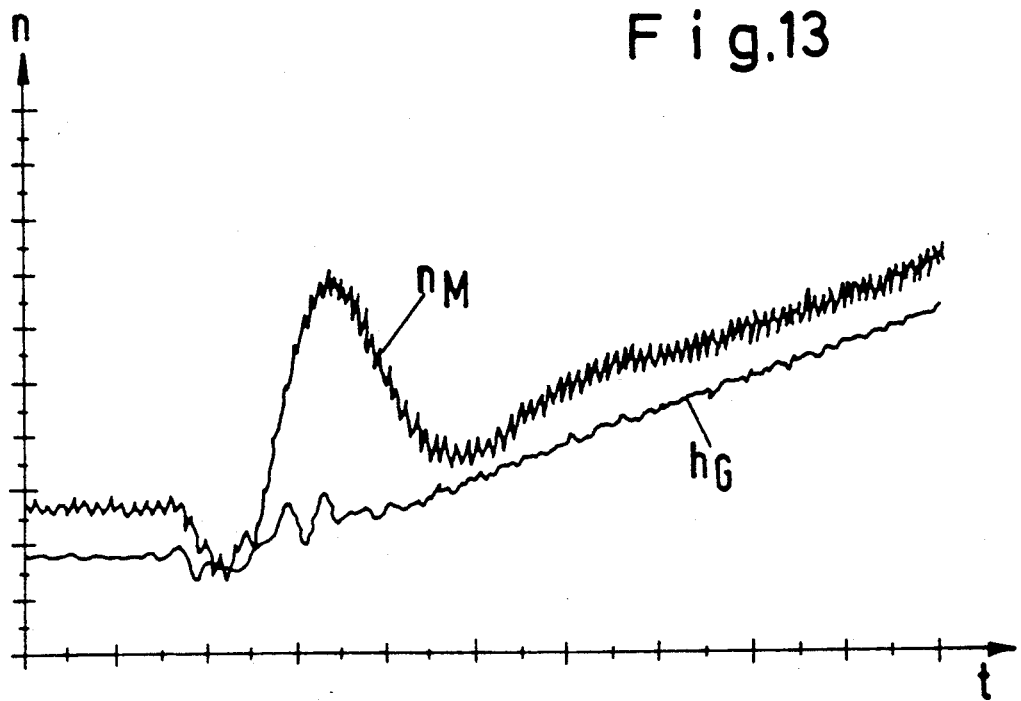
Fig.13
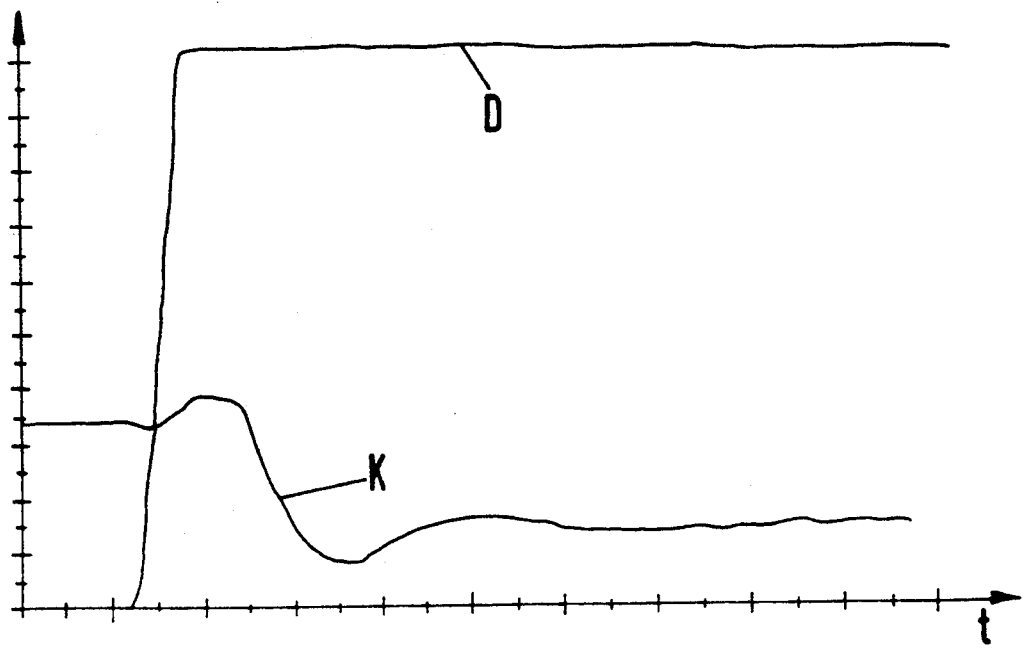

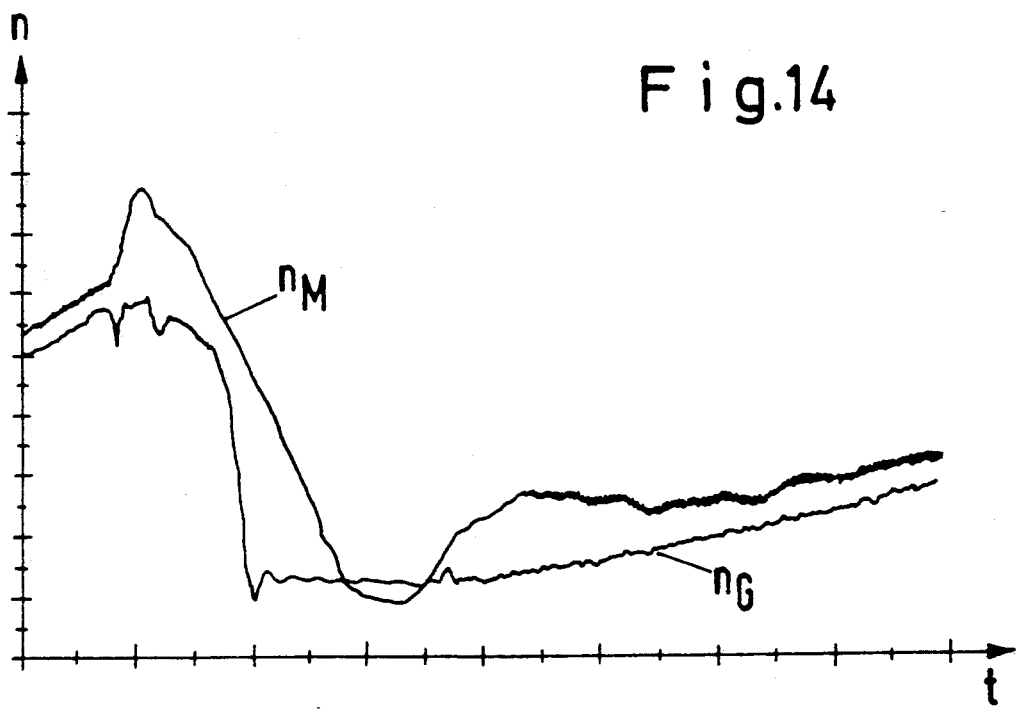
Fig.14
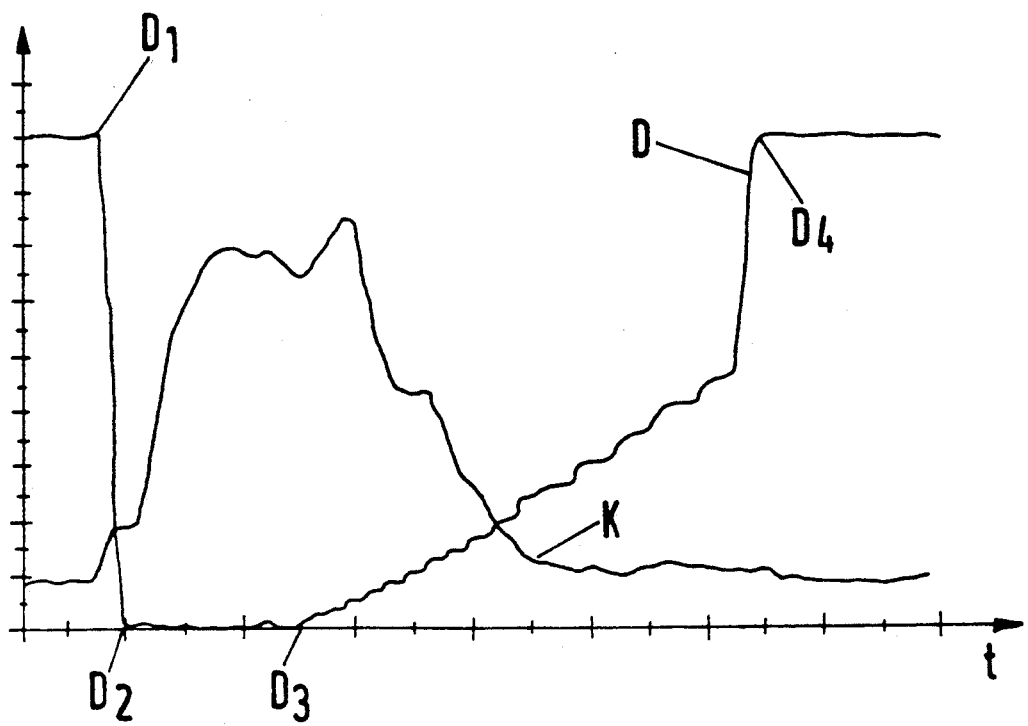

METHOD OF REGULATING THE OPERATION OF AUTOMATIC CLUTCHES

BACKGROUND OF THE INVENTION

The invention relates to improvements in methods of and in apparatus for regulating the operation of friction clutches in motor vehicles. More particularly, the invention relates to improvements in methods of and in apparatus for regulating the operation of automated friction clutches which are installed between the engines and the transmissions of motor vehicles. Still more particularly, the invention relates to a method of and to an apparatus for regulating automated friction clutches at least during certain stages of operation of motor vehicles, such as starting, shifting into a different gear, driving, acceleration, braking, driving in reverse, parking and/or transitions between such stages of operation. The invention also relates to improvements in the regulation of torque which is transmitted by a clutch between the output element of a prime mover (such as the internal combustion engine of a motor vehicle) and a transmission (such as a variable-speed transmission in the power train between the clutch and the wheels of a motor vehicle).

OBJECTS OF THE INVENTION

An object of the invention is to provide a method and an apparatus which enhance the comfort of the occupant or occupants of a motor vehicle and which render it possible to operate the engine economically (i.e., with low fuel consumption) as well as with greatly reduced wear upon the motor vehicle, particularly upon the friction clutch between the engine and the transmission.

Another object of the invention is to provide a motor vehicle which embodies the above outlined apparatus and which can be accelerated in a more satisfactory manner than heretofore known vehicles.

A further object of the invention is to prevent the development of body boom and other noise generating phenomena during operation of a motor vehicle.

An additional object of the invention is to provide novel and improved controls for an automatic clutch which is used between the engine and the transmission of a motor vehicle.

Still another object of the invention is to provide novel and improved safeguards against untimely or improper shifting of transmission into different gears.

A further object of the invention is to provide novel and improved electronic and fluid-operated controls for an automatic friction clutch.

Another object of the invention is to provide an apparatus which can be installed in existing motor vehicles.

An additional object of the invention is to provide a novel and improved method of regulating the transmission of torque from the output element of an engine to the input element of a variable-speed transmission in a motor vehicle.

A further object of the invention is to provide an apparatus which can react practically instantaneously to conform the condition of the friction clutch to varying operating conditions.

Another object of the invention is to provide an apparatus which is designed to compensate for manufacturing and other tolerances and which can regulate the operation of an automatic friction clutch in dependency upon any one, or any group, of a host of various parameters including the rotational speed of the output element of the engine, the rotational speed of the input element of the transmission, the temperature of the engine, the position of the throttle valve, the selected gear, the direction of rotation of the wheels, the speed of movement of the gas pedal and/or others.

SUMMARY OF THE INVENTION

One feature of the present invention resides in the provision of a method of regulating the operation of an automatic or automated friction clutch, which is installed between a prime mover (particularly an internal combustion engine) and a variable-speed transmission in a motor vehicle, during at least one of various stages of operation including starting, driving, accelerating, braking, driving in reverse and parking of the vehicle and shifting of transmission into different gears as well as during transitions between such various stages. The method comprises the steps of monitoring—at least for the purpose of starting the vehicle—at least one selected parameter of the clutch including monitoring and measuring the torque in the power train and/or the angular positions of clutch parts while the condition of the clutch is being changed from clutch-open, with the vehicle at a standstill and with the transmission in a gear other than neutral, at a predetermined speed toward clutch-closed to an extent such that the clutch transmits a torque less than that which is required to set the vehicle in motion, determining the clutch-closed condition when the transmitted torque and/or the angular positions of clutch parts reach a predetermined value, memorizing such value, and thereupon changing the condition of the clutch toward clutch-open, preferably to an extent such that the clutch assumes a predetermined state of readiness in which the clutch does not transmit any torque or transmits only a small or negligible drag torque.

If the clutch parts include relatively turnable input and output elements, the monitoring step can include ascertaining the angular positions of the input and output elements relative to each other. The input element can include friction linings, and the output element can include a hub.

Another feature of the invention resides in the provision of a method of regulating the operation of an automatic friction clutch, which is installed between a prime mover (particularly an internal combustion engine) and a power train in a motor vehicle wherein the power train has a transmission with at least one rotary (input or output) element, during at least one of various stages of operation including starting, driving, acceleration, braking, driving in reverse and parking of the vehicle and shifting of transmission into different gears as well as during transitions between such stages. The method comprises the steps of monitoring—at least for the purpose of starting the vehicle—a selected parameter of the clutch (such as the clutch engagement point which is the starting point for regulation of the clutch) as a function of a gradient of the at least one rotary element while the condition of the clutch is being changed from clutch-open, with the vehicle at a standstill and with the transmission in neutral gear, at a predetermined speed toward clutch-closed condition to an extent such that the clutch transmits torque to the at least one rotary element so that the at least one rotary element rotates at less than idling speed of the prime mover, determining the value of the gradient when the at least one rotary element assumes a predetermined state (such as a predetermined rotational speed) and a condition-dependent value (such as the locus of clutch actuation), memorizing information pertaining to the thus determined value of the gradient, and thereupon changing the condition of the clutch toward clutch-open, preferably to a position or condition of readiness in which the clutch does not transmit any torque or only transmits a small or negligible drag torque.

The just outlined method can further comprise the step of ascertaining the gradient as a function of the buildup of torque.

Such method can further comprise the step of ascertaining the gradient subsequent to elapse of an interval of changes of rotational speed within a predetermined range upon reaching of the upper limit of such range.

The method can further comprise the steps of repeatedly ascertaining and memorizing information pertaining to the start of regulation of the clutch, the engaged condition of the clutch, the state of readiness of the clutch, slip of the clutch, and identity or substantial identity of engine torque and clutch torque, and modifying the memorized information in response to renewed ascertainment of such information. The modifying step of such method can include comparing the ascertained information with memorized information and replacing the memorized information with ascertained information upon completion of a plausibility test.

Still further, the method can comprise the steps of ascertaining the energy which develops due to slip of the clutch, generating a signal when the ascertained energy reaches a predetermined value and/or changing the condition of the clutch when the ascertained energy reaches the predetermined value. Such method can further comprise the step of recommending shifting into a different gear in the case of a standard transmission and automatically shifting into a different gear in the case of automatic transmission when the predetermined value is exceeded, particularly shifting into the next lower gear.

The aforementioned position or condition of readiness can correspond to a condition in which the clutch is fully open (i.e., fully disengaged). The means for operating the clutch (i.e., for changing the condition of the clutch) can comprise a fluid-operated (hydraulic or pneumatic) system, e.g., a system employing a cylinder and piston unit and a power pack. The condition of the clutch can be monitored by monitoring the so-called clutch travel (e.g., the extent of shifting which is necessary to change the condition of the clutch from fully open or from fully closed) and/or by monitoring the pressure of fluid in the fluid-operated clutch operating system, e.g., in a conduit between the cylinder and piston unit and the power pack. The thus obtained values are memorized.

A further feature of the invention resides in the provision of an apparatus which can be utilized for the practice of the above outlined methods, namely to regulate the condition of an automatic or automated friction clutch which is arranged to transmit torque between a rotary output element (e.g., the crankshaft) of a prime mover (such as an internal combustion engine) and a rotary input element of a variable-speed transmission in a motor vehicle. The improved apparatus comprises adjustable (preferably fluid-operated) operating means for changing the condition of the clutch between clutch-open and clutch-closed, and sensor means comprising at least some of a plurality of sensors including a first sensor having means for generating first signals denoting the rotational speed of the output element of the prime mover, a second sensor having means for generating second signals denoting the rotational speed of the input element of the transmission, a third sensor having means for generating third signals denoting the condition of the clutch, a fourth sensor having means for generating fourth signals denoting the position of a movable throttle valve for the prime mover, a fifth sensor having means for generating fifth signals denoting the position of a movable gas pedal for the throttle valve, a sixth sensor having means for generating sixth signals denoting the position of the throttle valve during idling of the prime mover, a seventh sensor having drive gear recognition means for generating seventh signals denoting the position of a shift linkage for the transmission, an eighth sensor having means for generating eighth signals denoting the intention to shift gears by the shift linkage, a ninth sensor having means for generating ninth signals denoting an end position of the throttle valve, and a tenth sensor having means for generating tenth signals directly or indirectly denoting the temperature of the prime mover. The apparatus further comprises an electronic evaluating circuit having inputs for some or all of the above-enumerated signals, a first output for transmission of signals to the operating means, and a second output for transmission of signals to a motor for the throttle valve. Two or more of the aforementioned sensors can be combined into a single sensor; for example, one and the same sensor can monitor the intention to shift gears as well as the position of the shift linkage, one and the same sensor can be used to monitor the position of the throttle valve during idling of the prime mover as well as to monitor the end position of the throttle valve, and so forth. The evaluating circuit can comprise one or more computers and one or more memories as well as modules (such as comparators, counters, interfaces, integrators, converters and others) which process various signals from the sensors prior to transmission of processed signals by way of the outputs. The first sensor can comprise an annulus of teeth on the output element of the prime mover and a detector adjacent the path of movement of the teeth. The second sensor can be similar to or identical with the first sensor. The third sensor can comprise a potentiometer which monitors clutch travel; such monitoring can be carried out indirectly in that the potentiometer measures the extent of movement of the piston or cylinder of the aforementioned cylinder-piston unit forming part of the clutch operating means or of a lever or another part of a clutch actuating mechanism which receives motion from the cylinder-piston unit. The fourth sensor can also comprise a potentiometer which monitors the extent of movement of the throttle valve from closed or open position. A further potentiometer can form part of or constitutes the fifth sensor which ascertains the extent of movement of the gas pedal from or toward undepressed position.

An eleventh sensor can be provided to transmit to the evaluating circuit signals denoting the direction of rotation of the input element of the transmission. This sensor can directly monitor the direction of rotation of the input element or it can monitor the direction of rotation of one of several output elements of the transmission which receive torque from the input element, or the direction of rotation of wheels on the front or rear axle or another axle of the motor vehicle. The eleventh sensor can form part of the second sensor or it can constitute a discrete sensor, e.g., a sensor which is positioned to ascertain the direction of rotation of a driven wheel axle. Determination of actual direction of rotation of the wheels is desirable and advantageous when the transmission is shifted into a forward gear but the vehicle rolls backwards or vice versa. Signals which are transmitted by the eleventh sensor can be processed to prevent improper reaction of the regulating apparatus, e.g., when the vehicle is parked and faces upwardly on an upwardly sloping road but tends to roll backwards while the transmission is shifted into a forward gear. Under such circumstances, the signal which denotes the ascertained speed of the input element of the transmission can receive a negative sign; this enables the regulating apparatus to select proper clutch travel and hence an optimum clutch slip. In the absence of a determination of the direction of rotation of the input element of the transmission or of the direction of rolling of the wheels, the regulating apparatus would be likely to select an improper clutch slip and hence an improper transmission of torque from the prime mover to the power train.

An additional feature of the invention resides in the provision of an apparatus for regulating the transmission of torque by an automatic clutch which is installed between an output element of an engine and an input element of a variable-speed transmission in a motor vehicle. The apparatus comprises means for monitoring the actual clutch slip (such monitoring means can include means for comparing the rotational speeds of the output and input elements), and an evaluating circuit including a processor and having input means for periodic reception of input signals denoting various input parameters including (among others) the extent of clutch travel, the position of the throttle valve (load), the temperature of the engine and/or the selected drive gear of the transmission. The processor has a memory for information pertaining to the aforementioned input parameters, and the processor is operative to ascertain the desired clutch slip and characteristic regulation factors and to furnish signals for determination in a control system of clutch travel on the basis of differences between the actual and desired clutch slip.

An important difference between the improved method and apparatus on the one hand and conventional methods and apparatus on the other hand is that an automatic slip clutch which is regulated in accordance with the invention transmits or can transmit torque with a certain amount of slip depending upon the condition of the engine. This renders it possible to avoid the transmission of vibrations from the engine to the power train and to optimize the operation of the engine, of the power train and of the entire motor vehicle.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

FIG. 12 shows a set of curves representing certain parameters during starting of the motor vehicle;

FIG. 13 shows a set of curves denoting certain parameters during an abrupt change of load;

FIG. 14 shows a set of curves denoting certain parameters during shifting into a different gear.

DESCRIPTION OF PREFERRED EMBODIMENTS

Figure 1:
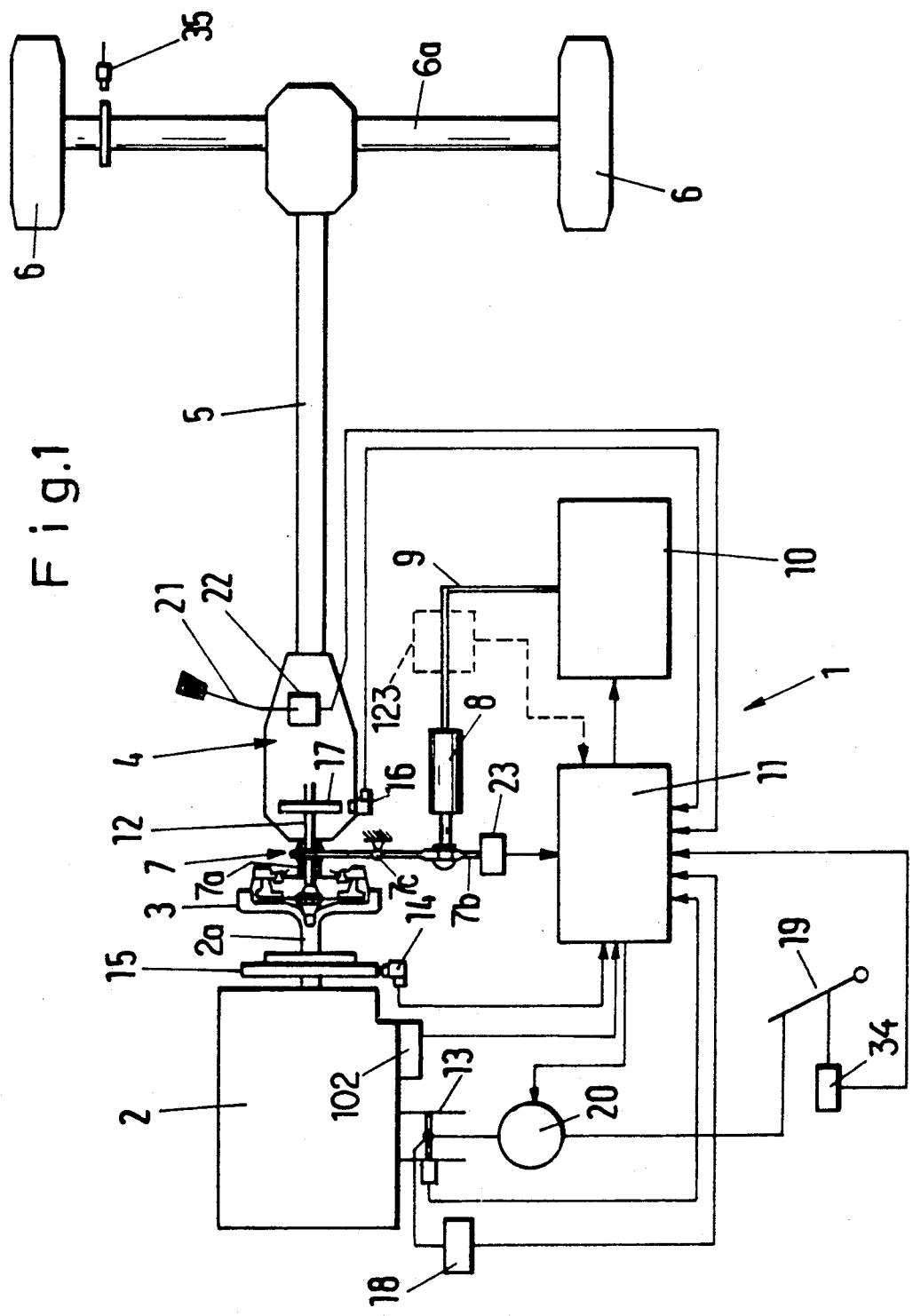
FIG. 1 is a schematic view of certain parts of a motor vehicle and of an apparatus which regulates the automatic friction clutch of the motor vehicle in accordance with one embodiment of the invention.

FIG. 1 shows certain parts of a motor vehicle which embodies one form of the improved torque control isolation apparatus 1, hereinafter called regulating apparatus. The vehicle comprises a prime mover in the form of an engine 2, a power train which connects the output element 2a of the engine 2 with at least one pair of wheels 6, and an automatic friction clutch 3 which serves to transmit torque between the output element 2a of the engine 2 and the input element 12 of a variable-speed transmission 4 forming part of the power train. The output element 5 of the transmission 4 serves to transmit torque to the axle 6a for the illustrated wheels 6.

The mechanism 7 for closing (engaging) and opening (disengaging) the friction clutch 3 comprises or can comprise a customary bearing 7a which is coaxial with the input element 12 of the transmission 4 and a forked lever 7b which is fulcrumed at 7c and can shift the bearing 7a in the axial direction of the input element 12. The means for operating the mechanism 7 includes a fluid-operated motor 8, particularly a hydraulic cylinder and piston unit, which can pivot the lever 7b in clockwise and counterclockwise directions. The operation of the unit 8 is controlled by a hydraulic control system 10 (hereinafter called power pack) which is connected with the unit 8 by one or more conduits 9.

The operation of the power pack 10, in turn, is controlled by an electronic evaluating circuit 11 which comprises one or more processors (e.g., computers) 143 (FIG. 3) and serves to indirectly select the condition of the friction clutch 3. The evaluating circuit 11 has several inputs for various signals which are processed into signals appearing at the right-hand output and being transmitted to the power pack 10 in order to initiate a change in the condition of the clutch 3 by way of the unit 8.

One input of the evaluating circuit 11 receives signals which denote the RPM of the output element 2a of the engine 2, another input receives signals denoting the RPM of the input element 12 of the transmission 4, a third input receives signals denoting the position of the movable component (e.g., the piston) of the unit 8, and a fourth input receives signals denoting the position of the throttle valve 13 for the engine 2. Additional inputs of the evaluating circuit 11 can receive (if and when necessary) signals denoting additional parameters such as the temperature of the engine 2, the temperature of air, one or more parameters of combustion products, one or more parameters of fuel for the engine 2, and/or others. The details of one presently preferred embodiment of the electronic evaluating circuit 11 will be described with reference to FIG. 3.

The means for generating signals which denote the RPM of the output element 2a of the engine 2 comprises a sensor 14 adjacent the path of orbital movement of an annulus of teeth 15 on a flywheel which is affixed to the output element 2a. The sensor 14 transmits signals to the corresponding input of the evaluating circuit 11. The teeth 15 can form part of a starter gear on the flywheel which is driven by the output element 2a of the engine 2.

The RPM of the input element 12 of the transmission 4 is monitored by a sensor 16 which is adjacent the path of orbital movement of teeth on a gear 17 which is affixed to the input element 12 or to a rotary element which receives torque from and rotates in synchronism with the input element 12. The sensor 16 transmits signals to the corresponding input of the evaluating circuit 11.

The position of the throttle valve 13 (i.e., the rate of admission of fuel to the engine 2) is monitored by a throttle position sensor 18, e.g., a potentiometer, which transmits signals to the corresponding input of the circuit 11.

The vehicle including the parts which are shown in FIG. 1 further comprises a gas pedal 19 which is indirectly coupled to the throttle valve 13 by a servo 20 receiving signals from the lefthand output of the evaluating circuit 11. The servo 20 can include or constitute an electric motor which is designed to alter the position of the throttle valve 13 in response to signals from the evaluating circuit 11.

A drive gear recognition means 22 constitutes a further sensor which is designed to monitor the condition or position of a shift linkage 21 and serves to transmit appropriate signals to the corresponding input of the circuit 11. The sensor 22 is preferably designed to further ascertain and to transmit signals denoting the intention to shift gears. Such signals furnish to the circuit 11 information denoting whether or not the shift linkage 21 is actually operated in a sense to shift into the next logically following (and hence anticipated) gear. If the shift linkage 21 is operated in the wrong direction, this should not influence the evaluating circuit 11, i.e., the circuit 11 will cause the friction clutch 3 to assume the clutch-open condition when the shift linkage 21 is moved in the proper (expected or anticipated) direction. Movement of the shift linkage 21 in the "wrong" (non-anticipated) direction is recognized by the evaluating circuit 11 as an intention not to shift gears, namely the circuit 11 does not recognize such movement of shift linkage 21 as a movement in a direction to shift gears.

In order to ascertain the extent of actuation of the clutch 3, i.e., the condition of the clutch, the apparatus 1 further comprises a clutch travel sensor 23 here shown as a potentiometer which is connected with the corresponding input of the evaluating circuit 11 to transmit signals which denote the angular position of the lever 7b and hence the momentary condition of the clutch 3 (namely whether open, closed or partially closed). The potentiometer 23 can also be said to constitute a distance or displacement measuring sensor because it monitors the angular position of the lever 7b, i.e., the position of the movable component of the unit 8, namely of that component which is displaced in order to change the angular position of the lever 7b and hence the condition of the clutch 3.

The travel sensor 23 can be used in addition to or in lieu of a pressure monitoring sensor 123 (indicated in FIG. 1 by broken lines) which is installed in the conduit or conduits 9 or elsewhere in the fluid-operated system including the unit 8, the conduit or conduits 9 and the power pack 10. Signals which are generated by the pressure monitoring sensor 123 and are transmitted to the corresponding input of the evaluating circuit 11 denote, or can be processed to denote, the pressure of fluid in the unit 8 and hence the momentary condition of the friction clutch 3.

It is often advisable to employ the clutch travel sensor 23 jointly with the pressure monitoring sensor 123. Signals from the sensor 123 can be used with particular advantage to regulate the clutch slip. Such regulation normally necessitates small or extremely small displacements of the movable component of the unit 8 and lever 7b.

A further sensor 102 transmits to the evaluating circuit 11 signals denoting the temperature of the engine 2.

Figure 2:
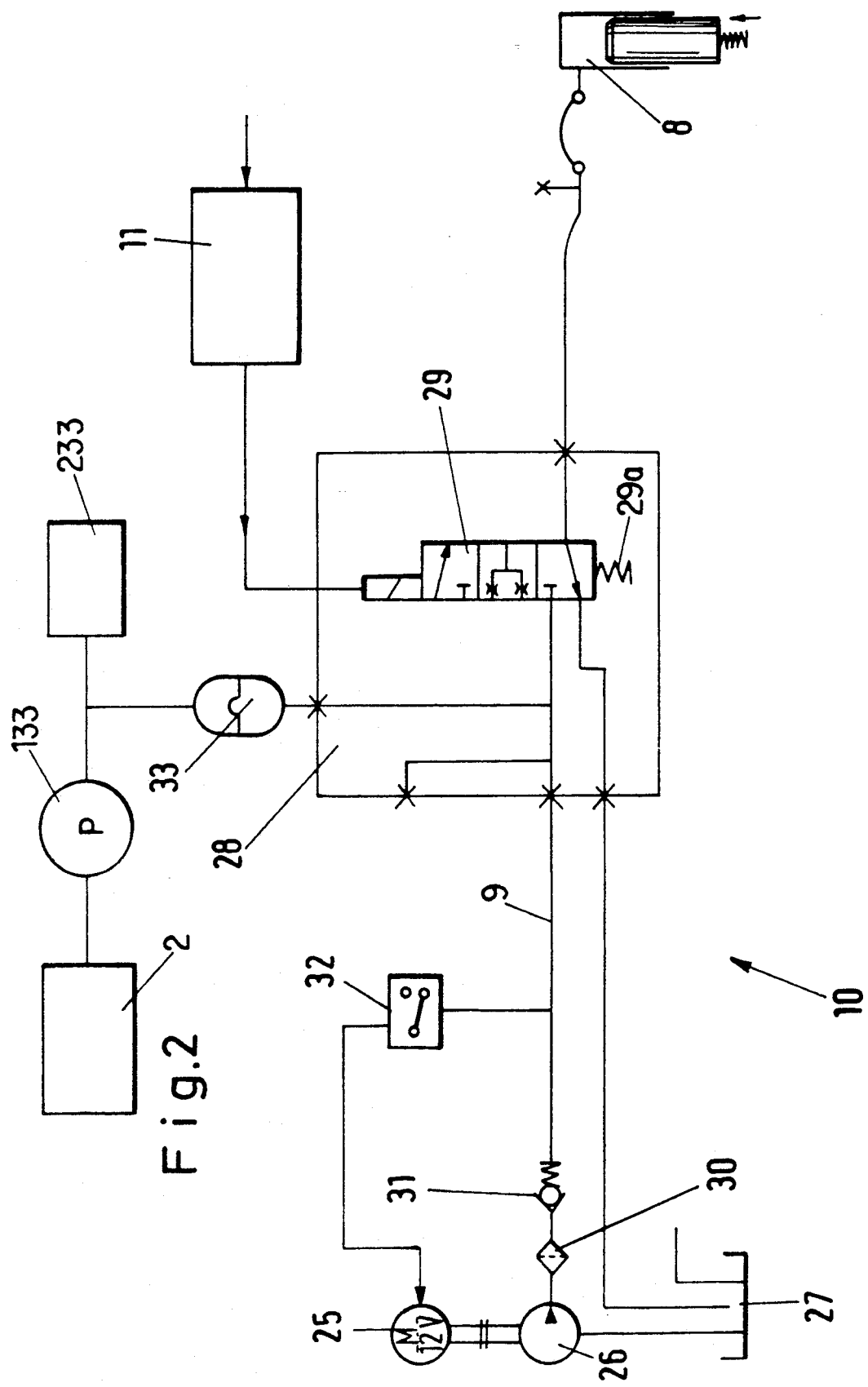
FIG. 2 is a diagrammatic view of the fluid-operated means for changing the condition of the friction clutch in the apparatus of FIG. 1.

The details of a presently preferred power pack 10 are shown in FIG. 2. The power pack 10 of FIG. 2 comprises a hydraulic pump 26 which is driven by an electric motor 25 and serves to draw hydraulic fluid (e.g., mineral oil) from a source 27 (e.g., a tank) to supply pressurized fluid to the cylinder of the unit 8 through the medium of a valve block 28. The latter comprises a solenoid-operated 3/3 regulating valve 29 with a spring-biased valving element which controls the flow of pressurized fluid in the conduit 9. The latter further contains a suitable filter 30 and a check valve 31 serving to prevent return flow of fluid from the valve block 28 toward the filter 30. Signals to change the position of the valving element in the valve 29 (against the opposition or under the action of the valve spring 29a) are transmitted by the corresponding output of the evaluating circuit 11. The selected position of the valving element in the valve 29 determines the rate of flow of pressurized fluid from the pump 26 to the cylinder of the unit 8.

The illustrated 3/3 valve 29 can be replaced with a proportional volumetric flow 4/4 valve or with a regulating valve which is operated in dependency upon pulse width modulation.

The conduit 9 further contains a pressure-responsive switch 32 which can turn off the motor 25 for the pump 26 when the pressure of conveyed fluid reaches a maximum permissible value, and a hydraulic pressure accumulator 33 (e.g., a so-called membrane elevator) which determines the lowermost pressure of fluid in the conduit 9. The pressure which is generated by the accumulator 33 can be selected in such a way that, when the motor vehicle is started, it is possible to open the friction clutch 3 at least once without supplying any energy. This renders it possible to dispense with a special motor 25 for the pump 26. When the engine 2 is on, the pressure accumulator 33 can receive fluid from a discrete pump 133 which is driven by the engine and can serve at least one additional purpose, e.g., to supply pressurized fluid to the power steering system 233 of the motor vehicle.

The clutch 3 can be of a conventional design, e.g., a clutch of the type disclosed in commonly owned U.S. Pat. Nos. 4,577,741; 4,572,341; 4,732,250 and 4,747,586.

The operation of the evaluating circuit 11 of FIGS. 1 and 2 is as follows:

When the engine 2 is to be started (i.e., when the motor vehicle is at a standstill), the evaluating circuit 11 causes the valving element of the valve 29 to assume a position (as soon as the ignition switch is closed) such that pressurized fluid which is supplied by the pressure accumulator 33 causes the unit 8, the lever 7b and the bearing 7a to open the friction clutch 3. As the engine 2 is started and its output element 2a rotates at idling speed (and the gear is in neutral), the sensor 14 transmits a corresponding signal to the evaluating circuit 11 and the latter transmits a signal which causes the valving element of the valve 29 to assume a position in which the condition of the friction clutch 3 is changed at a predetermined speed to clutch-closed so that the clutch 3 rotates the input element 12 of the transmission 4 but at an RPM less than the idling RPM of the output element 2a of the engine 2. At such time, the sensor 16 detects a certain gradient or parameter, such as the RPM or the angular acceleration of the input element 12. The sensor 16 transmits a corresponding signal to the respective input of the evaluating circuit 11. Such information enables the evaluating circuit 11 to transmit to the valve 29 a signal which is used to correct the condition of the clutch 3, namely to change (if necessary) the extent of movement of the movable component of the unit 8 (and hence the extent of angular movement of the lever 7b) from that position which is indicative of the clutch-open condition. This furnishes a starting point or clutch engagement point for regulation of the clutch 3. The starting point is indicative of that condition or state of the clutch 3 which is reached when the rapid change from clutch-open toward clutch-closed is completed. If the change of condition of the clutch 3 continues in a direction toward clutch-closed, such change is regulated by the apparatus 1 embodying the present invention. Ascertainment of the starting or clutch engagement point is desirable and necessary in order to at least substantially eliminate the influence of manufacturing tolerances and to thus ensure that one and the same apparatus 1 can be utilized to regulate the operation of automatic clutches in an optimum way in all or nearly all motor vehicles which are equipped with such clutches.

Depending upon the progress of the gradient to the boundary gradient, the theretofore covered distance by the lever 7b and by the mobile component of the unit 8 can be corrected in such a way that, if the gradient increases gradually (i.e., if the slope of the curve which denotes the change of such gradient is not pronounced), the correcting action in a direction to open the clutch 3 is more pronounced than when the curve is steep. For example, the slope of the aforementioned curve is not pronounced if the clutch plate or clutch disc of the friction clutch 3 has freedom of rather pronounced axial wobbling movement, i.e., the starting point is reached sooner than when the clutch plate is mounted with limited freedom or no freedom of axial wobbling movement.

When the starting point is reached, the evaluating circuit 11 transmits to the valve 29 a signal which causes the unit 8 to change the condition of the friction clutch 3 to fully open.

If the operator of the motor vehicle thereupon shifts into the first or reverse gear but preferably into the first, second or reverse gear, the power pack 10 abruptly changes the condition of the friction clutch 3 from fully open to the aforediscussed starting or clutch engagement point. If the operator then depresses the gas pedal 19, the electronic evaluating circuit 11 calculates a rotational speed on the basis of the family of characteristic curves which are stored in the processor 143 of the circuit 11, and such rotational speed is dependent upon the position of the throttle valve 13. The starting RPM is reached by increasing the idling RPM to the extent which is determined by the RPM as calculated by the evaluating circuit 11. The starting RPM is selected by the throttle valve 13 through the medium of the servo 20.

Controlled closing of the friction clutch 3 is thereupon carried out in such a way that, at a given position of the gas pedal 19, the starting RPM remains substantially or exactly constant while the condition of the clutch 3 is being changed to "clutch closed". The optimum RPM for starting the vehicle is or can be that RPM (memorized in the processor 143 of the evaluating circuit 11) at which the engine 2 supplies maximum torque for a particular position of the throttle valve 13. Such mode of closing the friction clutch 3 ensures that the vehicle is set in motion softly and gradually at an optimum RPM with practical elimination of the likelihood of stalling of the engine 2.

By taking into consideration the idling RPM for ascertainment of the starting RPM of the engine 2, the apparatus 1 accounts for the influence of climatic conditions. The importance and advantages of such ascertainment of starting RPM will be appreciated by bearing in mind that the idling speed of the engine 2 is influenced by the temperature of liquid coolant for the engine, and such temperature is dependent upon the temperature of the surrounding atmosphere.

Controlled closing of the friction clutch 3 can proceed until a desired or optimum slip RPM is reached or until such time when the torque which can be transmitted by the friction clutch at least approximates that which is then transmitted by the engine 2. Alternatively, it is also within the purview of the invention to cause the clutch 3 to assume a fully engaged or closed condition.

If the operator wishes to start the vehicle while the then selected gear is other than one of the aforementioned (first and reverse or first, second and reverse) gears, the friction clutch 3 remains open and the servo 20 can maintain the throttle valve 13 in closed position in order to avoid undesirable pronounced acceleration (revving) of the output element 2a of the engine 2.

The improved apparatus 1 is preferably designed in such a way that a certain slip between the engine 2 and the friction clutch 3 exists at least when the RPM of the engine is within that range which could entail rattling of the transmission 4 and/or a boom of the body of the motor vehicle. Such slip ensures elimination of high-frequency vibrations caused by engine firing pulses which are superimposed upon the engine RPM in motor vehicles having internal combustion engines. The amplitude of these torsional vibrations is dependent upon the load and, therefore, it is advisable to alter the slip RPM in dependency upon load. The slip RPM can be in the range of 10 to 100 revolutions per minute. That slip which is rendered possible by the friction clutch 3 acts as a low pass and prevents the aforediscussed vibrations from reaching that portion of the power train which is disposed behind the friction clutch 3 (as seen in the direction of transmission of torque from the engine 2 to the driven wheels 6).

Regulation of clutch slip is effected on the basis of signals which are supplied by the sensors 14 (RPM of the output element 2a) and 16 (RPM of the input element 12). The processor 143 of the evaluating circuit 11 ascertains the difference between the RPM of the engine 2 and the RPM of the input element 12, i.e., the then existing slip between the engine and the transmission 4. The thus ascertained difference (existing or actual slip) is compared with that difference which is stored in the processor 143 of the evaluating circuit 11 and is indicative of an optimum or desirable slip under the prevailing circumstances, namely in the momentary condition of the motor vehicle. If necessary, the slip is changed so as to match the desired or optimum slip, and such change is effected by causing the unit 8 to change the angular position of the forked lever 7b so that friction between the pressure plate and flywheel of the friction clutch 3 on the one hand, and the clutch plate between the flywheel and the pressure plate on the other hand, is altered for the purpose of reducing or increasing the slip between the engine and the transmission 4.

Information pertaining to clutch slip which is optimal for various operating conditions of the motor vehicle can be stored in the processor 143 of the evaluating circuit 11 in the form of a three-dimensional matrix of curves denoting the RPM, load (position of the gas pedal 19) and selected gear. Alternatively, the values of optimum clutch slip for various operating conditions of the engine can be stored in the form of tables, dots or functions. If the information is stored in the form of tables, each value in a table can correspond to a selected RPM range, e.g., 100 revolutions. A discrete table can be stored in the processor 143 of the evaluating circuit 11 for each gear ratio of the transmission 4 or, alternatively, the memory of the processor 143 in the circuit 11 can store a basic table wherein the stored information is altered with a correction factor in dependency upon the selected gear.

The evaluating circuit 11 can be further designed to recognize the direction of rotation or rolling of the wheels 6 of the motor vehicle. This is shown in FIG. 1 wherein the direction of rotation of the axle 6a for the driven wheels 6 is monitored by a directional sensor 35 serving to transmit corresponding signals to the respective input of the evaluating circuit 11. The directional sensor 35 can be integrated into the antilock braking system of the motor vehicle.

The directional sensor 35 can be omitted if the RPM monitoring sensor 16 is designed in such a way that it can ascertain the RPM as well as the direction of rotation of the input element 12. The directional sensor 35 or the modified (combined directional and RPM monitoring sensor 16 enables the evaluating circuit 11 to ascertain those stages of operation of the motor vehicle when the direction of rotation of driven wheels 6 or any wheels does not correspond to that which is indicated by the selected gear, e.g., when the wheels 6 roll backwards while the transmission 4 is shifted into a forward gear. Such situation can develop when the motor vehicle is positioned on an upwardly sloping road and faces uphill, the transmission 4 is shifted into first or second gear and the wheels 6 roll backwards, i.e., the vehicle moves downhill. Signals from the directional sensor 35, or from the modified sensor 16, enable the evaluating circuit 11 to avoid improper reaction under the just outlined or analogous circumstances. If the sensor 16 serves the additional function of indicating the direction of rotation of the input element 12 of the transmission 4, each signal which denotes the RPM of the input element 12 is preceded by a negative sign if the motor vehicle is rolling rearwardly while the transmission 4 is shifted into a forward gear. This enables the evaluating circuit 11 to properly calculate the slip RPM.

When the slip regulating arrangement is in use, it operates in principle as a torque limiting means. Due to the fact that the friction clutch 3 is set to operate with a selected slip RPM, i.e., that the regulating apparatus 1 has selected a certain slip RPM, it can be said that there exists an identity between the driving torque of the engine 2 and the slip torque of the friction clutch 3. The output which is used up as a result of slip plus the output which is transmitted to the transmission 4 matches the output of the engine 2. The slip torque is that torque which can be transmitted to the motor vehicle for driving or acceleration. The torque which is transmitted by the engine 2 can be abruptly increased in response to sudden depression of the gas pedal 19; this results in acceleration, and hence in an increase of RPM, of the output element 2a of the engine. Consequently, the engagement or closing of the friction clutch 3 becomes more pronounced because the increased difference between the RPM of the output element 2a and the RPM of the input element 12 is signaled to the evaluating circuit 11 by the RPM monitoring sensors 14, 16 whereby the circuit 11 causes the power pack 10 to change the angular position of the lever 7b via unit 8 to thus change the condition of the clutch 3 toward fully closed condition. The situation is reversed if the RPM of the output element 2a is reduced, i.e., the evaluating circuit 11 then causes the power pack 10 and the unit 8 to change the angular position of the lever 7b in a sense to change the condition of the clutch 3 toward clutch-open.

A vehicle can be designed in such a way that it is not necessary to operate with slippage of the friction clutch 3 at all times, i.e., that it is not necessary to avoid gear rattle and/or body boom (namely that it is not necessary to eliminate those high-frequency vibrations of the engine which are brought about by the firing sequence). Moreover, if the operation of the motor vehicle is within a range which is not critical for gear rattle and/or body boom, the regulating apparatus 1 can maintain the friction clutch 3 in fully closed (i.e., in fully engaged) condition. This eliminates wear because the clutch plate does not slide relative to the adjacent parts of the clutch; however, the operation is then such that the torque is not limited at all.

In accordance with a feature of the invention, that torque which the friction clutch 3 can transmit within this non-critical range of operation of the motor vehicle is selected in such a way that it matches or only slightly exceeds the momentary torque of the engine 2. As a rule, the determination of this non-critical range would necessitate the utilization of expensive torque measuring means. However, the improved apparatus is designed to ascertain such range as a result of much less expensive determination of rotational speed. To this end, the evaluating circuit 11 is caused to slightly open the clutch 3 at preselected intervals until the clutch begins to operate with a certain (relatively small) slip, for example, in the range of 5 to 10 revolutions per minute. This is detected by the evaluating circuit 11 in response to signals from the RPM monitoring sensors 14 and 16, and the circuit 11 then causes the power pack 10, the unit 8 and the mechanism 7 to close the clutch 3 so as to eliminate the slip. The just outlined partial opening of the clutch 3 can be carried out at a constant frequency. Such mode of operating the clutch 3 ensures identity of RPM between the output element 2a of the engine 2 and the input element 12 of the transmission 4 as well as at least substantial identity between the torque which is transmitted by the engine 2 and the torque which is transmitted by the clutch 3. If the vehicle is driven in a constant (unchanging) manner (constant drive), i.e., if the position of the gas pedal 19 is not changed, monitoring of the condition at which the engine torque matches the clutch torque can take place at less frequent intervals. The situation is different if changes in the magnitude of torque are abrupt, e.g., as a result of rapid depression or rapid release of the gas pedal 19. At such time, the frequency at which the clutch 3 is slightly disengaged in order to achieve a certain slip should be increased to a considerable extent. For example, the just discussed frequency can be altered (increased or reduced) in dependency on the velocity of movement of the gas pedal 19 and/or in dependency on the velocity of movement of the mobile part or parts of the throttle valve 13. FIG. 1 shows a potentiometer 34 which constitutes a pedal speed, monitoring sensor and is operatively connected with the pedal 19 to transmit to the corresponding input of the evaluating circuit 11 signals denoting the speed of movement of the pedal 19 to or from depressed position.

It is further desirable and advantageous to ascertain that locus of the movable component or components of the unit 8 or that angular position of the lever 7b (namely that condition of the clutch 3) at which the apparatus 1 has set the clutch to operate with no slip at all or with a minimal slip which is below a preselected threshold value. This is the so called clutch zero point. Such information is stored in the evaluating circuit 11 together with the information pertaining to corresponding position of the throttle valve 13. When the torque undergoes an abrupt change, the evaluating circuit 11 receives signals denoting the new position of the throttle valve 13 and such information is compared with information which is stored in the processor 143 of the circuit 11 to ensure immediate determination of the new slip (or no-slip or zero) point, i.e., the new point of equilibrium between the torque which is transmitted by the engine 2 and the torque which is transmitted by the friction clutch 3.

The information which is stored in the processor 143 of the evaluating circuit 11 and denotes those clutch positions at which the slip is zero or negligible is replaced or corrected in the event of deviations, i.e., the apparatus 1 is capable of "learning". Departures from memorized or stored information can develop as a result of changes of friction coefficient and/or as a result of changes of force with which the relatively turnable parts of the friction clutch 3 are pressed against each other. This entails a change of the zero point at which the slippage of the clutch 3 is zero or negligible. In lieu of ascertaining and memorizing such zero point, it is also possible to ascertain and memorize the corresponding pressure of fluid in the unit 8, conduit 9 and/or power pack 10. Furthermore, it is possible to ascertain and memorize the zero point by ascertaining and memorizing the corresponding forces.

The details of one presently preferred evaluating circuit 11 are shown in FIGS. 3 and 5 to 14. As already mentioned above, one input of the circuit 11 receives signals from the sensor 14 which monitors the RPM of the output element 2a of the engine 2 and transmits signals to the circuit 11 by way of an interface 124. The signals from interface 124 denote the frequency at which the teeth 15 of the gear on the output element 2a advance past the sensor 14. The output element 2a can constitute a crankshaft, and the frequency at which the teeth 15 advance past the sensor 14 is then indicative of the RPM of the crankshaft.

Signals which are transmitted by the sensor 16, which monitors the RPM of the input element 12 of the transmission 4, are shaped by a second interface 125. The frequency at which the teeth of the gear 17 on the input element 12 advance past the sensor 16 is indicative of the RPM of the input element 12.

Signals from the clutch travel sensor 23 are transmitted to and shaped by a third interface 126. A fourth interface 127 is provided to shape signals which are transmitted by the sensor 18 and denote the position of the throttle valve 13, i.e., the rate of admission of fuel to the engine 2.

The drive gear recognition sensor 22 transmits digital signals which denote the selected gear ratio and, if desired and necessary, the intention to shift gears. Such signals are shaped in a further interface 128.

Signals which are transmitted by the sensors 14, 16 are digital signals which must be converted into analog signals. To this end, the evaluating circuit 11 comprises a high-frequency oscillator 129 which transmits timing pulses to monoflops in the form of counters 130, 131 respectively connected with the outputs of the interfaces 124 and 125. Signals from the counters 130, 131 are processed by integrators 132, 133, respectively.

Figure 5:
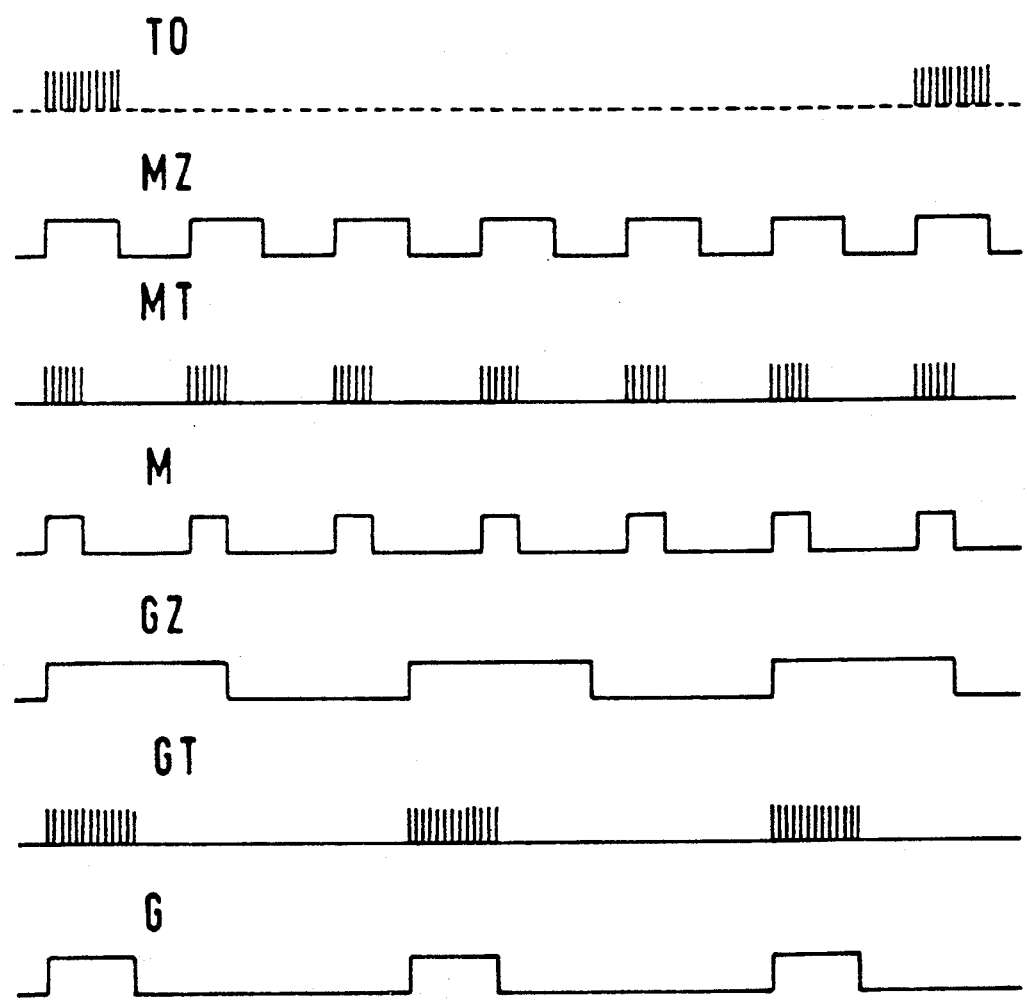
FIG. 5 shows a system of curves denoting signals which are generated by, and which are transmitted to, the evaluating circuit.

The shapes of signals which are transmitted by certain sensors for and by certain components of the evaluating circuit 11 are shown in FIG. 5. The topmost curve TO denotes timing pulses which are transmitted by the oscillator 129. The latter is operated at a constant high frequency. The second topmost curve MZ denotes signals which are transmitted by the sensor 14 and are indicative of the RPM of input element 2a of the engine 2. The number of teeth 15 equals Zn. The counter 130 is adjustable, and the signals at its output are denoted by the curve M; this counter is set to transmit a signal in response to reception of Dm signals from the interface 124. The counter 130 transmits a signal in response to each signal of the curve MZ, i.e., in response to each signal which is generated by one of the teeth 15. The arrangement is such that the counter 130 counts Dm signals from the oscillator 129 (note the curve MT) in response to reception of a signal from the interface 124. The output is switched in response to each overflow to ensure the generation of RPM-proportional analog voltages.

The output of the counter 130 transmits signals which are denoted by the curve M, and the pulse duty factor of these signals is proportional to the RPM of the output element 2a of the engine 2.

Signals from the sensor 16 are denoted by the curve GZ in FIG. 5, and signals which are received by the counter 131 are denoted by the curve GT. The pulse duty factor of such signals is proportional to the RPM of the input element 12 of the transmission 4. The number of teeth on the gear 17 equals Zg. The curve G denotes signals at the output of the counter 131. This counter is programmed to a value Dg.

The evaluating circuit 11 processes the aforediscussed signals in accordance with the equations $$Um = K \times Dm \times Zm, \text{ and}$$

$$Ug = K \times Dg \times Zg.$$

wherein K is a proportionality factor. If the selected adjustment for the engine RPM counter 130 is $Dm = K \times Zg$, and the selected adjustment for the transmission counter 131 is $Dg = K \times Zm$, it is possible to standardize the aforediscussed value Um of the engine RPM and the aforediscussed value Ug of the transmission RPM.

The integrator 132 integrates the output signals of the engine counter 130, and the integrator 133 integrates the output signals of the transmission counter 131. The thus obtained integrated values are compared in a comparator 134, and the signal (voltage) at the output of the integrator 134 is indicative of the difference between the RPM of the output element 2a of the engine 2 and the RPM of the input element 12 of the transmission 4, i.e., the difference is indicative of slippage of the friction clutch 3.

Figure 6:
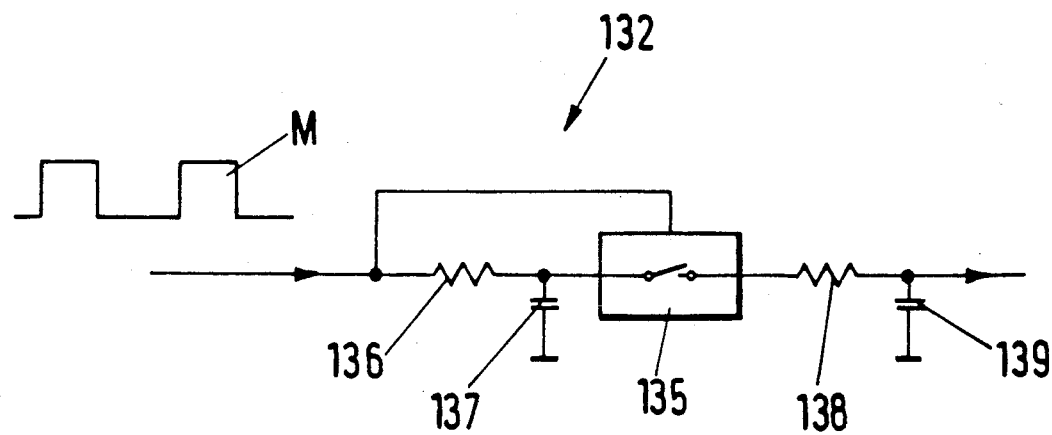
FIG. 6 is a diagrammatic view of an RPM-depending integrator which can be used in the evaluating circuit.

Damping of engine firing dependent fluctuation of RPM of the output element 2a of the engine 2 and shortening of intervals which are necessary to ascertain the RPM of the output element 2a is achieved with the integrator 132 which is an RPM-dependent integrator. The details of a presently preferred integrator 132 are shown in FIG. 6. The input of this integrator receives signals (curve M of FIG. 5) from the output of the engine RPM counter 130 with a pulse duty factor T. Such signals change the condition of a switch 135 which is connected in series with a resistor 136 (having a resistance $R_1$), a capacitor 137 (having a capacitance $C_1$), a resistor 138 (having a resistance $R_2$) and a capacitor 1139 (having a capacitance $C_2$). The integration time $t_1 = R_1 \times C_1$, and the integration time $t_2 = R_2 \times 1/T \times C_2$. When the signals from the engine RPM counter 130 close the switch 135 of the integrator 132, the dynamic resistance increases with decreasing pulse duty factor, i.e., in response to decreasing RPM of the engine 2. This ensures that the integration time is prolonged when the RPM of the output element 2a of the engine 2 is low.

Figure 7:
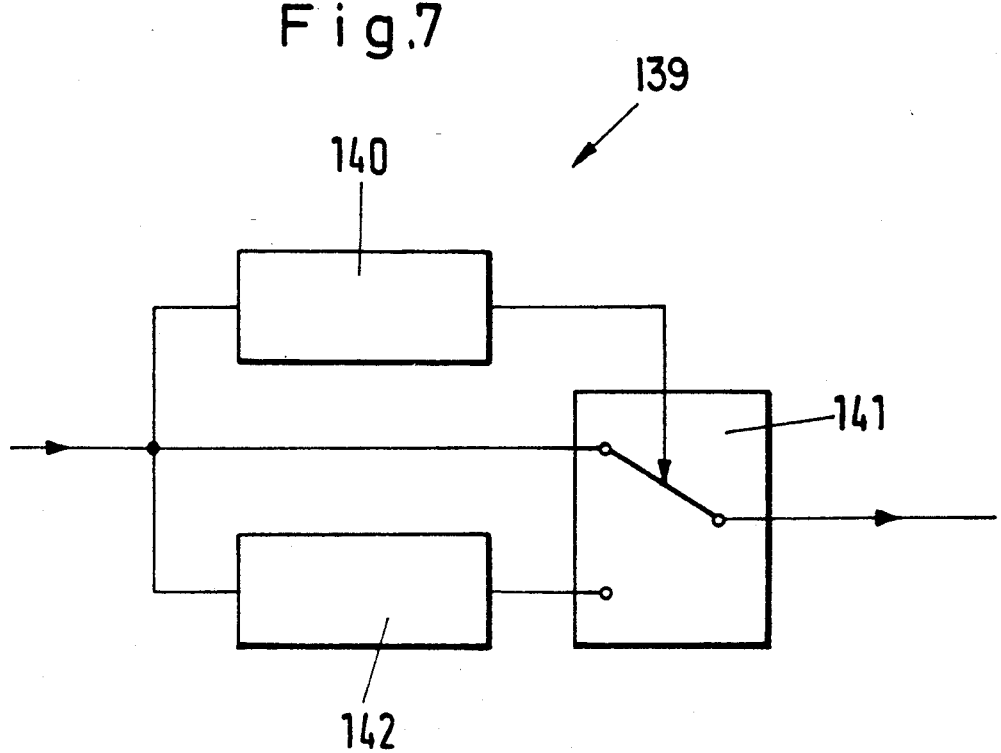
FIG. 7 is a diagrammatic view of a switching stage in the evaluating circuit.

The comparator 134 transmits signals to a switching stage 139 which generates signals denoting the absolute value of slippage of the friction clutch 3. The elements of a presently preferred embodiment of the switching stage 139 are shown in FIG. 7. The input of the stage 139 receives voltage signals which are proportional to the clutch slip, and such signals are compared with a zero value in a comparator 140. If the voltage is above zero, the condition of a switch 141 in the switching stage 139 remains unchanged, i.e., signals denoting positive slip of the friction clutch 3 remain unchanged and are permitted to pass through the switching stage 139. However, if the comparator 140 detects a voltage which is below zero, the condition of the switch 141 is changed and the output of the stage 139 transmits a voltage signal which is inverted by an inverter 142.

Signals denoting the slippage of friction clutch 3 and other signals at the inputs of the evaluating circuit 11 are analog signals and must be combined with reference signals as well as with other signals. Such reference signals and other signals must be corrected or altered in dependency upon the operating conditions of the motor vehicle. These reference signals and other signals are ascertained and processed by the processor 143 of FIG. 3 which contains a programmed computer and an addressible memory for a family of characteristic curves. The memory contains characteristic curves and/or a field of characteristic curves denoting the clutch slip and being memorized in dependency upon load, in dependency on momentary setting of the transmission 4 and, if necessary, in dependency upon other engine parameters such as the temperature of the engine, the RPM of the engine and/or others. The memory for such characteristic curves contains values for the desired or optimum slip as well as control factors. The meaning of such values and their processing will be explained below.

The processor 143 controls a multiplexer 144 and an analog/digital converter 145 serving to ensure that the various characteristic curves can be processed at optimum intervals. The analog values denoting the RPM of the output element 2a of the engine 2, the RPM of the input element 12 of the transmission 4, the condition of the friction clutch 3, the position of the throttle valve 13 and others are converted into digital values which renders it possible to address the memory of the processor 143. The addressed values constitute reference or desired values of clutch slip and are transmitted to a digital/analog converter 146. The actual slip which is determined by the switching stage 139 and the reference or desired value of slip which is denoted by the signal from the digital/analog converter 146 are compared in a comparator 147 which furnishes a signal denoting the difference between the desired and actual slip, and such signal is thereupon further processed in the evaluating circuit 11.

The means for processing signals from the comparator 147 comprises a P-controller 148 and an I-controller 149. The characteristic curve or amplification of each system to be controlled can be regulated in dependency upon parameters in a manner to be explained with reference to FIG. 8.

Figure 8:
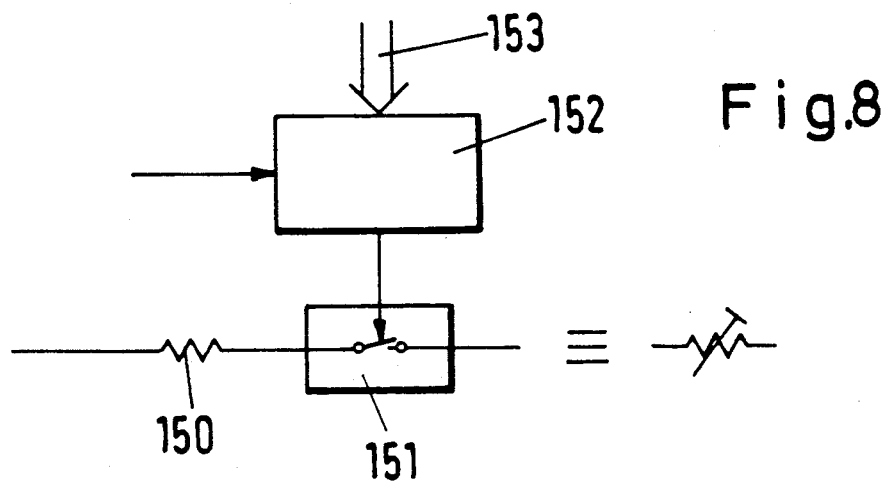
FIG. 8 is a diagrammatic view of an absolute value determining module in the evaluating circuit.
Figure 9:
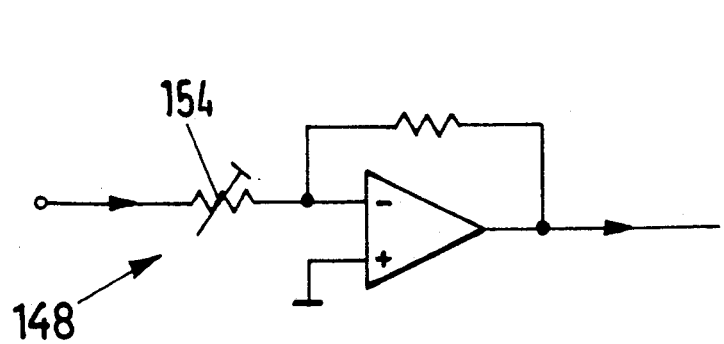
FIG. 9 is a diagrammatic view of a P-controller which can be used in the evaluating circuit.
Figure 10:
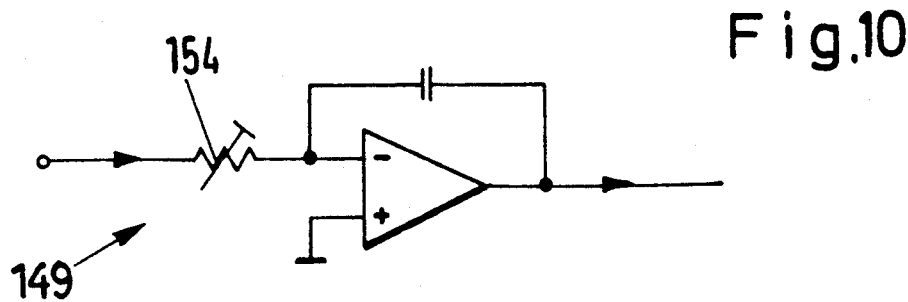
FIG. 10 a diagrammatic view of an I-controller which can be used in the evaluating circuit.
Figure 11:
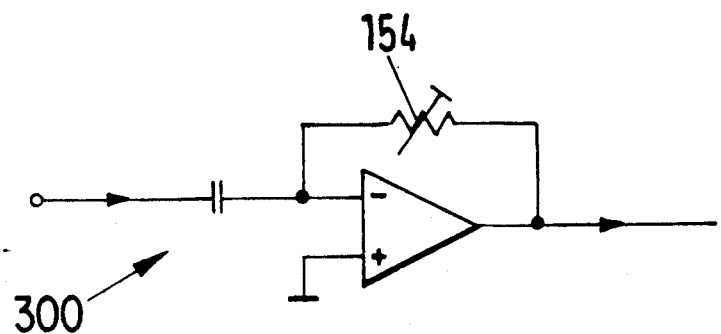
FIG. 11 is a diagrammatic view of a D-controller which can be used in the evaluating circuit.

FIG. 8 shows a resistor 150 in series with a switch 151 which is controlled by signals at the output of a timer 152 to close in response to such signals. The pulse duty factor of the timer 152 is determined by digital signals 153. Thus, the duty factor of the timer 152 determines the closing times of the switch 151. The effective resistance of the resistor 150 varies in dependency upon the closing time of the switch 152. Such resistor with a parameter-dependent resistance is shown at 154 in FIGS. 9 and 10 which respectively show the elements of a presently preferred P-controller 148 and a presently preferred I-controller 149. FIG. 11 shows the elements of a D-controller which also embodies a resistor 154. The parameters are denoted by the character 153 (FIG. 8) and serve to alter the characteristic curves of the corresponding controllers. Such parameters are obtained from the processor 143 which addresses the memory and supplies the thus obtained signals (after processing, if necessary) to the P-controller 148 and to the I-controller 149. This ensures a parameter-dependent processing of signals denoting the difference between the actual slip and the desired or reference slip of the friction clutch 3. The modified components of the value denoting the difference between the actual slip and the desired slip are totalized in a summing circuit 155 (FIG. 3), and the thus obtained signals are amplified in an output or power stage 156 which transmits signals to the power pack 10.

Figure 3:
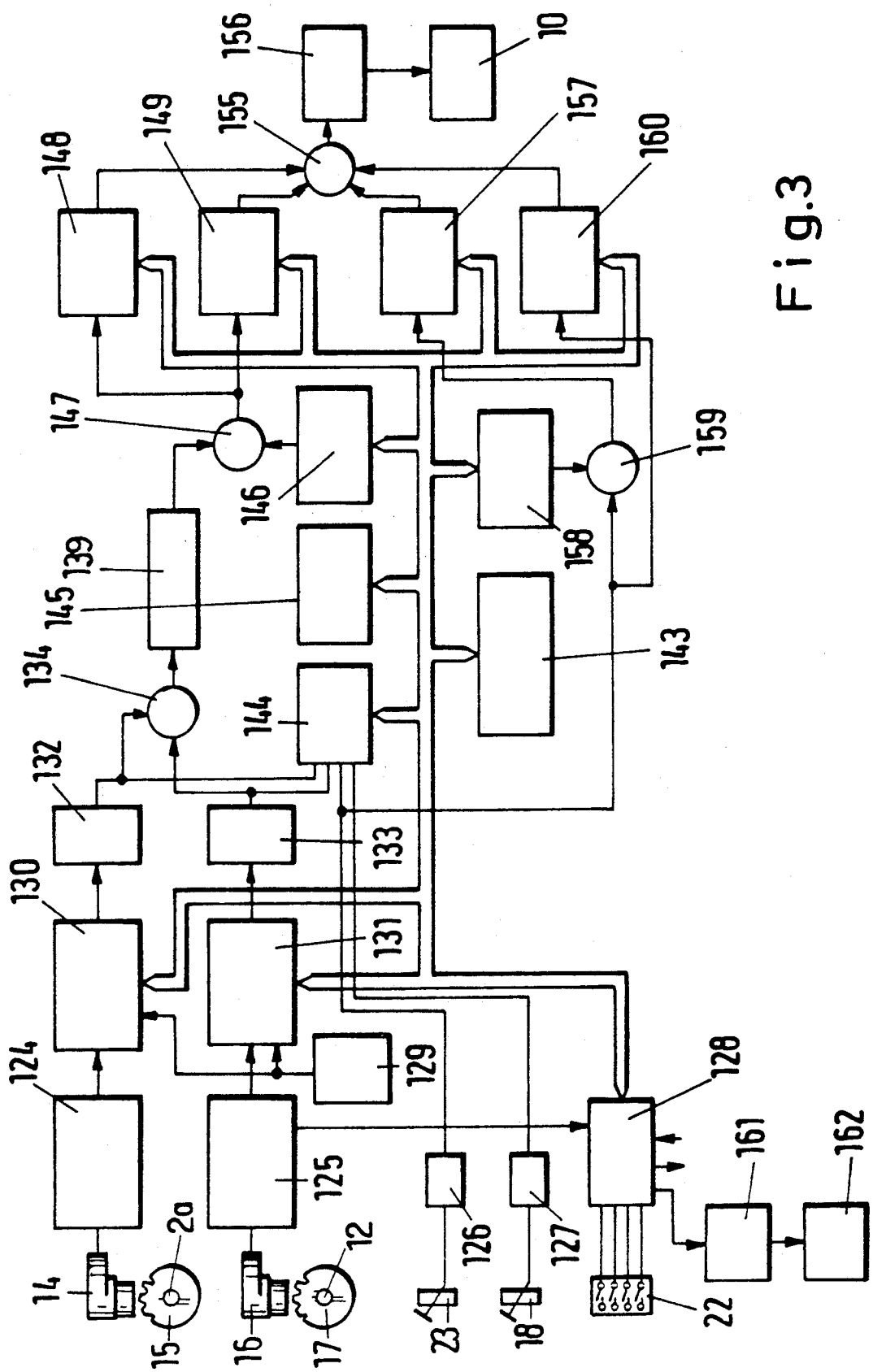
FIG. 3 is a block diagram of the electronic evaluating circuit in the apparatus of FIG. 1.

FIG. 3 shows that the evaluating circuit 11 can contain only the P-controller 148 and the I-controller 149. However, this circuit can also comprise the D-controller of FIG. 11 and/or other controllers.

The aforedescribed constituents of the evaluating circuit 11 are necessary to regulate the slip of the friction clutch 3. They determine the momentary condition of the clutch 3 in dependency upon the desired or optimum slip.

It is desirable to directly regulate the condition of the friction clutch 3 independently of the slip under certain operating circumstances. This holds especially true for starting of the motor vehicle as well as for shifting into different gears. To this end, the evaluating circuit 11 comprises a parameter-dependent regulating circuit 157 having an output which is connected with an input of the aforementioned summing circuit 155. Shifting into a different gear and/or certain other operating conditions are recognized by the processor 143 which transmits to the corresponding input of the regulating circuit 157 a signal and which also transmits a signal to a digital-/analog converter 158 having an output connected with a comparator circuit 159. Signals from the processor 143 to the converter 158 and comparator circuit 159 denote the desired or reference values of the condition of friction clutch 3. The comparator circuit 159 is further connected with the multiplexer 144 to receive signals denoting the actual condition of the friction clutch 3. The signal denoting the difference between the desired and actual values of slip is transmitted to and is processed in the regulating circuit 157 prior to being transmitted to the power pack 10 via summing circuit 155 and power or output stage 156. In order to avoid fluctuations of regulation of clutch slip, it is possible to employ a regulating line which can be adjusted in dependency on changes of parameters to serve as a reverse feedback.

The interface 128 which receives signals from the drive gear recognition sensor 22 transmits signals to an output or power stage 161 which controls a regulator 162 forming part of or constituting the servo 20 for the throttle valve 13. When the linkage 21 is actuated to shift into a different gear, the regulator 162 closes the throttle valve 13 to prevent racing of the engine 2.

It will be noted that the input signals are analog signals which are converted into digital signals prior to being processed in the processor 143. The information which is stored in the memory of the processor 143 and is processed (if necessary) prior to being transmitted by an output of the processor 143 is reconverted into analog signals which serve as reference values for clutch slip or for the distance to be covered by the lever 7b in order to properly adjust the clutch during a particular stage of operation of the motor vehicle and which also serve as parameters for adjustment of various regulating branches. Such design renders it possible to achieve an analog regulation with variable regulating characteristic in order to optimally conform the regulation to the existing operating conditions. The various fields of characteristic curves in the processor 143 are addressed in dependency upon various input signals. Thus, based on the recognition of intention to shift gears, the regulating operation is switched from an adjustment of slip to an adjustment of displacement of the lever 7b. When the evaluating circuit 11 is in the process of regulating the slip of the friction clutch 3, the memorized characteristic curves can be switched in dependency on the selected gear and/or in dependency upon load. The working period of the illustrated processor 143 is 5 milliseconds so that it is possible to change the reference values and the output signals while the motor vehicle is in use. The position of the lever 7b is regulated during starting, during shifting into different gears and when the RPM of the input element 12 of the transmission 4 exceeds a programmed maximum value.

The interface 128 cooperates with the drive gear recognition sensor 22 and with the intention to shift gears recognition means of the sensor 22 to permit a modification of the regulating operation.

When the motor vehicle is to be set in motion, the evaluating circuit 11 ascertains the desired starting RPM of the output element 2a of the engine 2 in dependency upon the position of the throttle valve 13, i.e., in dependency on desired acceleration of the vehicle. Such RPM of the output element 2a is thereupon maintained constant as a result of continuous determination of actual RPM and appropriate changes of the magnitude of slip. The idling RPM is also considered. As already mentioned above, it is preferred to program the evaluating circuit 11 in such a way that the motor vehicle can be started only when the linkage 21 has been actuated to shift into first or reverse gear or into first, second or reverse gear. If the operator attempts to start the vehicle while the linkage 21 has selected another gear, the friction clutch 3 remains open, i.e., the processor 143 prevents starting of the motor vehicle.

The throttle valve 13 is closed whenever the linkage 21 is actuated to shift into a different gear and the value 13 is opened to a required extent only when the shifting into a different gear is completed. The velocity at which the friction clutch 3 and the throttle valve 13 are adjusted during starting is limited by a branch circuit 160 (FIG. 3) in order to avoid excessive reactions.

The reference value of clutch slip normally amounts to 50 to 100 revolutions per minute. However, the field of characteristic curves can represent other reference values. In the high RPM range when the fluctuations of engine RPM are small or are above the resonance frequency of the vehicle and vehicle body, the regulating apparatus 1 preferably maintains the clutch 3 in a condition such that the slip is zero. The regulating apparatus operates in the starting mode when the RPM of the output element 2a is below the idling RPM. When the RPM is above the aforementioned value, the clutch 3 is fully closed and transmits torque without slip.

FIG. 12 illustrates the mode of operation of the regulating apparatus 1 under certain operating conditions, namely during starting of the motor vehicle at partial load. The position of the throttle valve 13 is denoted by the curve D; such position determines the desired acceleration and hence the load. The curve nM denotes the desired RPM of the output element 2a of the engine 2, and such desired RPM is obtained in response to appropriate selection of the distance K which monitored by the clutch travel sensor 23. The curve nG denotes the RPM of the input element 12 of the transmission 4. FIG. 12 clearly shows the gradual rise of the RPM (curve nG) of the input element 12, i.e., the optimum operation of the vehicle during starting.

FIG. 13 shows the mode of operation of the regulating apparatus 1 in response to an abrupt rise in load without changing into a different gear. The load rises from zero to 100 percent; this can be seen in the lower part of FIG. 13 by observing the pronounced upward slope of the curve D (position of the throttle valve 13). The apparatus 1 operates with slip regulation.

The curves in the diagrams of FIG. 14 denote the operation during shifting into a different gear, namely from the second into third gear at maximum load. The intention to shift recognition takes place at or close to D1 to entail automatic closing of the throttle valve 13 at D2. Shifting from second into third gear takes place at D3, and the throttle valve 13 is thereupon gradually opened between D3 and D4 in order to prevent revving of the engine 2. The regulation of clutch 3 takes place as a function of travel. The curve nG shows the gradual progress of RPM of the input element 12.

The clutch 3 is fully closed in response to turning off of the engine 2, i.e., while the engine RPM (curve nM) decreases. The sensor 23 monitors the travel of the lever 7b. The information which is supplied by the sensor 23 is memorized in the processor 143 and can be used as a basic value for regulation.

The monitored data can be compared with the actually ascertained information and stored in the field of characteristic curves. This renders it possible to conform the stored information to the actual operating conditions, particularly to compensate for wear upon the friction clutch 3.

Figure 4:
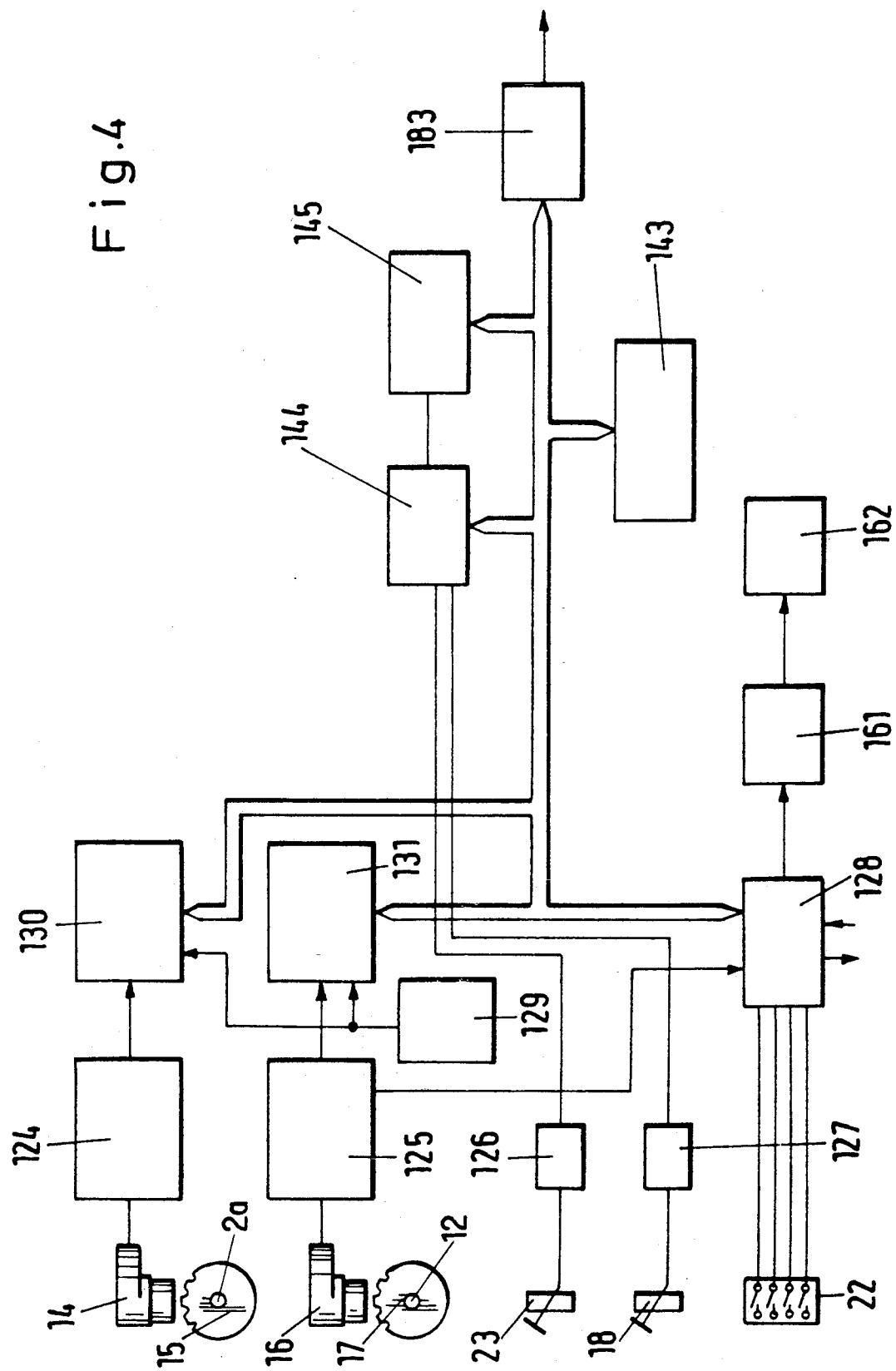
FIG. 4 is a block diagram of a modified electronic evaluating circuit.

FIG. 4 shows a modified evaluating circuit. All such parts which are identical with the corresponding parts of the evaluating circuit 11 of FIG. 3 are denoted by similar reference characters.

The RPM sensor 14 transmits to the interface 124 signals at a frequency which is determined by rotational speed of teeth 15 on the gear which is mounted on the output element 2a. The frequency is proportional to the RPM of the output element 2a. The interface 124 shapes the signals and transmits them to the corresponding input of the counter 130.

The RPM sensor 16 transmits to the interface 125 signals at a frequency which is determined by the speed of teeth on the gear 17 which is driven by the input element 12 of the transmission 4. Such signals denote the rotational speed of the input element 12 and are shaped in the interface 125 which transmits signals to the corresponding input of the counter 131.

The clutch travel sensor 23 transmits signals to an interface 126 which shapes the signals and transmits signals to the multiplexer 144.

The sensor 18 transmits signals which denote the position of the throttle valve 13, and such signals are shaped in the interface 127 which serves to transmit signals to the multiplexer 144.

FIG. 4 further shows the drive gear recognition sensor 22 which transmits digital signals to an interface 128. The sensor 22 can further serve to transmit signals which denote the intention to shift gears. All such signals are processed by the interface 128 which transmits signals to the power or output stage 161 of the modified evaluating circuit.

The counter 130 ascertains the intervals between successive signals from the sensor 14, and the counter 131 determines the intervals between successive signals from the sensor 16. To this end, the counters 130, 131 have additional inputs which are connected with the output of the high-frequency oscillator 129. The readings of the counters 130, 131 are monitored by the processor 143; such readings are inversely proportional to the RPM. The processor 143 controls the multiplexer 144 and the analog-digital converter 145 so that the various data can be processed at timely spaced intervals. Data denoting the condition of the clutch 3, the position of the throttle valve 13 and other parameters are converted into digital values.

The processor 143 comprises an addressable memory for storage of characteristic curves. The memorized information is indicative of clutch slip in dependency upon load, upon the selected gear of the transmission and, if desired or necessary, upon certain other engine parameters. The memory of the processor 143 contains information pertaining to the desired clutch slip as well as regulating factors.

The processor 143 ascertains the RPM of the output element 2a and the RPM of the input element 12 on the basis of readings which are furnished by the counters 130 and 131, respectively, and such information is processed in 143 to ascertain the actual slip of the clutch 3. The computer of the processor 143 compares the thus ascertained actual slip with the desired or reference slip which is stored in the memory of the processor, and the thus obtained information is utilized to ascertain the difference between the actual slip and the desired clutch slip. Such information is further processed by the computer of the evaluating circuit. To this end, the processor 143 relies on conventional arithmetic procedures to reconstruct and calculate a P-branch and an I-branch. If necessary, the computation can further involve determination of a D-branch and/or other branch or branches.

Figure 15:
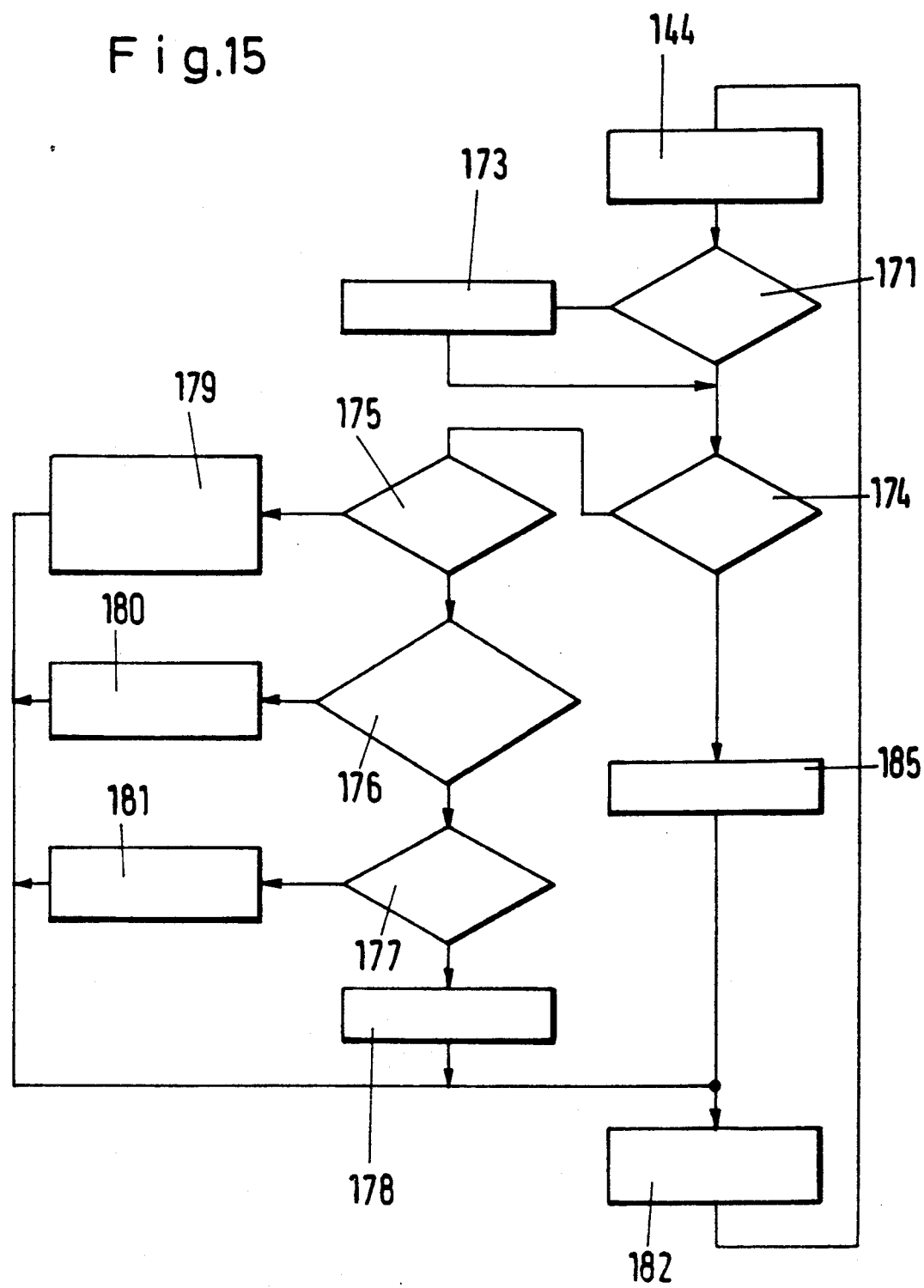
FIG. 15 is a flow chart showing the evaluation of data by the processor in the modified evaluating circuit of FIG. 4.

Regulation in the modified evaluating circuit of FIG. 4 does not necessitate resort to analog control systems because the operation of such systems is replaced by the program of the processor 143. The programming of the processor 143 of FIG. 4 is preferably such as shown in the flow chart of FIG. 15. Thus, the multiplexer 144 supplies signals denoting the RPM of the engine (at 171), the condition of the clutch, the position of the throttle valve, gear recognition and others. The first branch 171 is addressed to furnish information pertaining to the RPM of the engine, and such information is compared (at 173) with a zero value which is obtained when the engine is turned off while rotating its output element at less than idling speed. When the RPM of the engine drops below idling speed, the unit 173 completely closes the clutch and the zero point of the clutch (i.e., the fully closed condition) of the clutch is ascertained and memorized in the field of characteristic curves. Since the design of the clutch is known, determination of the zero point renders it possible to ascertain that travel of the lever 7b which is necessary to fully open the clutch. When the clutch is fully open, the corresponding point serves as a starting point for regulation of travel of the lever 7b.

The next branch 174 serves to ascertain the intention (if any) to shift gears. If such intention exists, the component 185 fully opens the friction clutch so that the transmission can be shifted into a different gear. If no such intention exists, or if the transmission has already been shifted into the desired gear, the unit 175 ascertains whether the transmission has been shifted into neutral or into idling gear. If the transmission is shifted into first gear and/or in reverse, or if the RPM of the input element 12 of the transmission is below a preselected minimum value, the unit 176 initiates the starting. The throttle valve is open before the unit 177 actually effects the setting of the motor vehicle in motion (see 178).

The unit 179 serves to ascertain during each program (according to 175) the engagement point as well as the idling RPM, and the clutch is caused to assume a fully open condition.

The unit or branch 176 connects to a programming unit 180 which regulates the desired or reference slip of the friction clutch. The unit 177 connects to a program unit 181 which opens the clutch prior to the engagement point. The unit 182 prepares the weight parameters for control systems of process.

The reproduction of controllers by a program flow or execution involves a calculation of input values of the control branches and a product with a factor from the memory. The various products are totalized. A damping branch is realized by establishing a difference between values which are obtained during successive computation periods. Each such period can take up an interval of 3 milliseconds.

The processor 143 carries out the aforedescribed calculations and transmits output signals to an output stage or power stage 183 which transmits signals to the power pack 10. The stage 183 can comprise a digital-analog converter. Alternatively, it is possible to employ a pulse generator with a controlled pulse duty factor.

Certain important advantages of the improved method and apparatus include the possibility of starting without a clutch pedal, problem-free starting of the vehicle on a steep grade, the absence of engine stalls, the possibility of shifting into different gears without a clutch pedal, jerk-free starting and shifting and shifting of gears without using the gas pedal. Moreover, the improved method and apparatus render it possible to eliminate idle rattle and/or shut-off gear rattle. Still further, it is now possible to achieve vibration insulation for drive and coast gear rattle and to eliminate the body boom. Still further, the apparatus can embody a torque limiter with slip equaling or approximating zero; there is no surging and the apparatus can counteract drive train clunk as well as tip-in and back-out jerk. The apparatus can be incorporated into an antilock brake system and/or combined with a traction control system and is ready for integration into all on-road or off-road vehicles. It is possible to achieve full shut-off, and the apparatus can embody or it can constitute an automatic clutch wear indicator which is important for diagnosis purposes.

A vehicle which embodies the improved apparatus offers to the operator the precise control of a standard transmission combined with the comfort and soft shifting of an automatic transmission. All this can be achieved without resorting to a clutch pedal. It can be said that a vehicle which embodies the improved apparatus combines the best of standard and automatic transmissions into a compact and lightweight driver-controlled unit.

The clutch which is controlled by the improved apparatus and in accordance with the improved method can be a standard automatic clutch. The various sensors serve to transmit signals which ensure smooth control of clutch engagement and disengagement. As explained above, such sensors preferably continuously monitor various parameters of the engine, clutch, transmission and throttle valve. These signals (and certain additional signals (such as from the sensors 34 and 35) enable the evaluating circuit of the improved apparatus to regulate the transfer of torque in such a way that the clutch is capable of isolating and damping all or practically all unwanted vibrations, such as high-frequency vibrations which are caused by engine firing pulses and harmonics resulting in gear rattle. Moreover, the apparatus can damp low-frequency surges which are caused by driver input and/or by road conditions. It can be said that the improved apparatus ensures a more comfortable ride to each occupant of the vehicle by eliminating all gear rattle, torque spikes and surges. The more precise torque control enhances the fuel economy and reduces the likelihood of damage to the transmission. Incorporation of the improved apparatus into a motor vehicle is beneficial to manual as well as to automatic transmissions. The transmission of a motor vehicle which embodies the improved apparatus can outperform today's standard or automatic transmissions because it invariably conveys torque from the engine to the transmission with maximum efficiency.

Absence of balky starts, jerky shifts and lurching uphill starts contributes to the comfort of the driver of the vehicle and to each other occupant. Moreover, the passenger compartment of the vehicle is quieter than the passenger compartment in a vehicle which is equipped with a standard or automatic transmission but without the improved clutch regulating apparatus.

Still further, the improved apparatus renders it possible to employ power train or drive train components which are currently in production. In fact, the improved apparatus is so efficient at controlling torque that the dimensions, weight and cost of the power train can be reduced. Moreover, efficient torque control which can be achieved with the method and apparatus of the present invention renders it possible to achieve savings in development and production costs for new power train components because it is now possible to use the same power train components for vehicles of different weights.

The incorporation of the improved apparatus into a motor vehicle renders it possible to expand the utilization and/or application of so-called electronic continuously variable transmissions (ECVT) which, by their very design, are particularly sensitive to torque spikes or peaks. Moreover, the improved apparatus can enhance the performance of antilock braking systems (known as ABS) and the effectiveness of traction control systems (TCS).

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A method of regulating the operation of an automatic friction clutch, which is installed between a prime mover and a transmission in a power train of a motor vehicle, during at least one of various stages of operation including starting, driving, accelerating, braking, driving in reverse and parking of the vehicle and shifting of transmission into different gears as well as during transitions between said stages, comprising the steps of monitoring—at least for the purpose of starting the vehicle—at least one selected parameter including measuring the torque in the power train and/or the angular positions of clutch parts while the condition of the clutch is being changed from clutch-open, with the vehicle at a standstill and with the transmission in a gear other than neutral, at a predetermined speed toward clutch-closed to an extent such that the clutch transmits a torque less than that which is required to set the vehicle in motion: determining the clutch-open condition when the transmitted torque and/or the angular positions of clutch parts reach a predetermined value; memorizing said value; thereupon changing the condition of the clutch toward clutch-open; fully opening the clutch in dependency on starting the engine; thereupon closing the clutch at least until determination of regulation starting point; memorizing the corresponding condition of the clutch: and thereupon reopening the clutch until the clutch reaches a state of readiness.

2. The method of claim 1 of regulating the operation of a clutch wherein the clutch parts include relatively turnable input and output elements, wherein said monitoring step includes ascertaining the angular positions of the input and output elements relative to each other.

3. The method of claim 2, wherein the input element includes friction linings and the output element includes a hub.

4. A method of regulating the operation of an automatic friction clutch, which is installed between a prime mover and a power train in a motor vehicle wherein the power train has a transmission with at least one rotary element, during at least one of various stages of operation including starting, driving, acceleration, braking, driving in reverse and parking of the vehicle and shifting of transmission into different gears as well as during transitions between said stages, comprising the steps of monitoring—at least for the purpose of starting the vehicle—a selected parameter of the clutch while the condition of the clutch is being changed from clutch-open, with the vehicle at a standstill and with the transmission in neutral gear, at a predetermined speed toward clutch-closed to an extent such that the clutch transmits torque to the at least one rotary element so that the at least one rotary element rotates at less than idling speed of the prime mover; determining a condition-dependent value; memorizing information pertaining to the thus determined value; thereupon changing the condition of the clutch toward clutch-open; fully opening the clutch in dependency on starting of the engine; thereupon closing the clutch at least until determination of the regulation starting point; memorizing the corresponding condition of the clutch; and thereupon reopening the clutch until the clutch reaches a state of readiness.

5. The method of claim 4, wherein said monitoring step comprises monitoring said selected parameter of the clutch as a function of a gradient of the at least one rotary element.

6. The method of claim 5, further comprising the step of ascertaining said gradient on the basis of angular acceleration, particularly a measurement of angular acceleration.

7. The method of claim 5, further comprising the step of ascertaining said gradient as a function of the buildup of torque.

8. The method of claim 5, further comprising the step of ascertaining said gradient subsequent to elapse of an interval of changes of rotational speed within a predetermined range upon reaching of the upper limit of such range.

9. The method of claim 5, wherein the distance of the starting point of regulation from a zero point, at which the clutch is closed, varies in dependency upon the rise of a curve denoting the gradient and such distance increases in response to flattening of the curve.

10. The method of claim 5, wherein said determining step further comprises determining the value of said gradient when the at least one rotary element assumes a predetermined state.

11. The method of claim 10, further comprising the step of alternating said locus in dependency upon the determined value of said gradient.

12. The method of claim 10, further comprising the step of ascertaining said gradient on the basis of rotational speed, particularly the rotational speed of the at least one rotary element.

13. The method of claim 10, wherein said predetermined state of said at least one rotary element is a predetermined rotational speed.

14. The method of claim 4, wherein said step of changing the condition of the clutch toward clutch-open includes partially opening the clutch.

15. The method of claim 1 or 4, comprising the step of changing the condition of the clutch toward clutch-closed in dependency upon the selection of a gear ratio from a position of readiness to an engagement point at a predetermined speed and thereupon in dependency on the position of the gas pedal of the vehicle at a rate such that the rotational speed of the engine conforms to a memorized reference value.

16. The method of claim 15, comprising the step of maintaining the rotational speed of the engine at least substantially constant.

17. The method of claim 5, further comprising the step of memorizing a plurality of reference values each denoting a rotational speed of the engine corresponding to a given position of the throttle valve in the engine and denoting the maximum torque of the engine for the respective position of the throttle valve.

18. The method of claim 1 or 4, comprising the steps of ascertaining the actual temperature-dependent idling speed of the engine in neutral gear of the transmission and while the throttle valve of the engine is closed, and raising the idling speed by a value which is dependent on the corresponding temperature.

19. The method of claim 18, comprising the steps of selecting the rotational speed of the engine, for the purpose of setting the vehicle in motion, as a function of the selected gear of the transmission, in open position of the throttle valve of the engine and upon reaching of the predetermined raised idling speed of the engine, closing of the clutch being regulated from the starting point of regulation.

20. The method of claim 1 or 4, comprising the step of changing the condition of the clutch to clutch-open through a predetermined range in dependency on reaching the starting point of regulation.

21. The method of claim 1 or 4, comprising the step of changing the condition of the clutch to clutch-open through a maximum range in dependency on reaching the starting point of regulation.

22. The method of claim 1 or 4, comprising the step of closing the clutch in response to turning off of the engine.

23. The method of claim 22, further comprising the step of memorizing the extent of change of condition of the clutch to clutch-closed.

24. The method of claim 1 or 4, further comprising the step of smoothing the ascertained rotational speed of the engine and/or of the at least one rotary element by means of a filter, particularly a low pass filter, at least during starting of the vehicle.

25. The method of claim 24, wherein the smoothing step includes smoothing by means of a follow-up or overhung filter.

26. The method of claim 1 or 4, comprising the step of operating the clutch with slip while the vehicle is in motion, at least within a portion of the full range of rotational speeds of the engine.

27. The method of claim 26, wherein said step of operating the clutch with slip includes selecting a continuous minor slip.

28. The method of claim 26, further comprising the step of varying the slip.

29. The method of claim 28, wherein said step of varying the slip includes varying the slip in dependency upon the rotational speed of the engine.

30. The method of claim 28, wherein said step of varying the slip includes varying the slip in dependency upon the magnitude of torque which the clutch transmits from the engine to the transmission.

31. The method of claim 28, wherein said step of varying the slip includes varying the slip in dependency upon the position of the throttle valve of the engine.

32. The method of claim 28, wherein said step of varying the slip includes varying the slip in dependency upon the selected gear of the transmission.

33. The method of claim 28, further comprising the step of memorizing data denoting reference values of slip in dependency on various operating conditions of the vehicle including the condition of the engine, of the clutch and/or of the throttle valve, said step of varying the slip including conforming the slip of the clutch to the corresponding reference value.

34. The method of claim 33, wherein said memorizing step includes memorizing in the form of a family of characteristics, at least one table or a characteristic curve.

35. The method of claim 28, further comprising the step of changing the condition of the clutch toward closed in response to increasing slip.

36. The method of claim 28, further comprising the step of changing the condition of the clutch toward open in response to decreasing slip.

37. The method of claim 28, wherein said step of varying the slip includes varying the contact pressure of the clutch.

38. The method of claim 1 or 4, comprising the step of varying the torque which is transmitted by the clutch while the vehicle is in motion, at least within a portion of the full range of rotational speeds of the engine, in dependency upon operational parameters, to a value which at least approximates the torque which is transmitted by the engine.

39. The method of claim 38, further comprising the step of memorizing operational parameters, when the engine torque equals or approximates clutch torque.

40. The method of claim 1 or 4, comprising the step of ascertaining the slip of the clutch and varying the torque which is transmitted by the clutch until the slip is eliminated.

41. The method of claim 1 or 4, comprising the steps of monitoring the slip of the clutch and memorizing in the form of a curve or a field of characteristics those parameters of the vehicle at which the slip equals or approximates zero.

42. The method of claim 1 or 4, comprising the steps of monitoring the torque which is transmitted by the engine and the torque which is transmitted by the clutch while the clutch is closed, and partly opening the clutch at predetermined intervals to establish a minor slip, and thereupon changing the condition of the clutch toward clutch-closed to at least reduce said minor slip.

43. The method of claim 42, further comprising t step of varying said intervals in dependency upon the condition of the vehicle, particularly in dependency upon the condition of the engine.

44. The method of claim 43, wherein said step of varying the intervals includes lengthening the intervals when the transmission of torque by the power train is substantially constant.

45. The method of claim 43, wherein said step of varying the intervals includes shortening the intervals in response to changes of torque which is transmitted by the power train, particularly in response to abrupt changes of transmitted torque.

46. The method of claim 43, wherein said step of varying the intervals includes varying such intervals in dependency upon the speed of movement of the gas pedal.

47. The method of claim 1 or 4, comprising the steps of repeatedly ascertaining and memorizing information pertaining to a start of regulation of the clutch, the engaged condition of the clutch, the state of readiness of the clutch, slip of the clutch, and at least substantial identity of engine torque and clutch torque, and modifying the memorized information in response to renewed ascertainment of said information.

48. The method of claim 47, wherein said modifying step includes comparing the memorized information with the ascertained information and replacing the memorized information with the ascertained information when the ascertained information departs from memorized information.

49. The method of claim 47, wherein said modifying step includes comparing the ascertained information with memorized information and replacing the memorized information with ascertained information upon completion of a plausibility test.

50. The method of claim 1 or 4, comprising the steps of repeatedly ascertaining information pertaining to a start of regulation of the clutch, the engaged condition of the clutch, the state of readiness of the clutch, slip of the clutch, and at least substantial identity of engine torque and clutch torque, averaging successively ascertained information, and storing the averaged information.

51. The method of claim 1 or 4, comprising the steps of memorizing those rotational speeds of the engine which correspond to different positions of the gas pedal, and correcting the memorized rotational speed in dependency upon a parameter of the engine, at least during starting of the vehicle.

52. The method of claim 1 or 4, comprising the steps of ascertaining the idling rotational speed of the engine in open condition of the clutch and in undepressed position of the gas pedal or while the transmission is in a gear other than neutral and/or the clutch is closed while the gas pedal is in undepressed position.

53. The method of claim 1 or 4, comprising rapidly opening the clutch for a short interval of time in response to an abrupt change of load, to avoid locking during transition through zero slip condition of the clutch.

54. The method of claim 53, further comprising the step of monitoring the velocity of load change including monitoring the speed of movement of the gas pedal and/or the rotational speed of the engine.

55. The method of claim 54, comprising the step of opening the clutch to the regulation starting point, partially depressing the gas pedal, and thereupon changing the condition of the clutch toward clutch-closed to an extent which is a function of the position of the partly depressed gas pedal.

56. The method of claim 55, comprising the step of opening the clutch to the regulation starting point while the vehicle is coasting and in non-depressed position of the gas pedal.

57. The method of claim 1 or 4, comprising the step of limiting the starting of the vehicle to starting while the transmission is in one of first, second and reverse gears.

58. The method of claim 1 or 4, comprising the steps of setting the throttle valve for operation of the engine at idling speed without the clutch prior to shifting into a different gear while the vehicle is in motion, changing the condition of the clutch toward clutch-closed upon completion of the shifting step, and changing the position of the throttle valve to that which corresponds to the position of the gas pedal.

59. The method of claim 1 or 4, comprising the steps of ascertaining and memorizing various parameters of the clutch including the zero point, the regulation starting point, the position of readiness and the wear, and displaying the memorized parameters when they reach a preselected threshold value.

60. The method of claim 1 or 4, comprising the steps of ascertaining the energy which develops due to slip of the clutch, generating a signal when the ascertained energy reaches a predetermined value and/or changing the condition of the clutch when the ascertained energy reaches said predetermined value.

61. The method of claim 60, comprising the step of changing the condition of the clutch toward clutch-open or clutch-closed at a predetermined speed when said predetermined value is exceeded to thereby reduce the developing friction energy.

62. The method of claim 60, comprising the step of recommending shifting into a different gear in the case of a standard transmission and automatically shifting into a different gear in the case of an automatic transmission when said predetermined value is exceeded, particularly shifting into the next lower gear.

63. The method of claim 60, wherein the step of ascertaining the energy which develops due to slip of the clutch includes integrating the product of slip and transmitted torque as a function of time.

64. The method of claim 63, comprising the step of reducing the ascertained energy at predetermined intervals of time by a cooling constant.

65. The method of claim 1 or 4, comprising the step of opening the clutch in response to actuation of the shift linkage, shifting into a gear, and initiating controlled closing of the clutch at a speed which is regulated in dependency upon the position of the gas pedal.

66. The method of claim 65, further comprising step of regulating the admission of fuel to the engine in dependency upon the speed of closing the clutch.

67. The method of claim 1 or 4, comprising the step of changing the condition of the clutch by way of a hydraulic volume controlling valve.

68. The method of claim 1 or 4, comprising the step of changing the condition of the clutch by way of a hydraulic proportional-volume servo valve which is arranged to integrate with reference to the condition of the clutch.

69. The method of claim 1 or 4, comprising the steps of opening the clutch prior to a shifting into different gear only when the shift linkage is stressed or moved in a direction corresponding to shifting into an adjoining gear.

70. The method of claim 69, further comprising the step of transmitting to the clutch actuating mechanism a signal to open the clutch in dependency on the selected gear and as a function of actuation or stressing of shift linkage in a direction toward shifting into an adjoining higher or lower gear.

* * * * *